(12) United States Patent
Imine

(10) Patent No.: US 7,702,797 B2
(45) Date of Patent: Apr. 20, 2010

(54) DATA PROCESSING APPARATUS AND DATA PROCESSING METHOD

(75) Inventor: Ryotaro Imine, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 993 days.

(21) Appl. No.: 11/444,635

(22) Filed: Jun. 1, 2006

(65) Prior Publication Data

US 2006/0274368 A1   Dec. 7, 2006

(30) Foreign Application Priority Data

Jun. 7, 2005   (JP)   .............................. 2005-167370

(51) Int. Cl.
*G06F 15/16*   (2006.01)
(52) U.S. Cl. ..................... 709/227; 358/1.15; 358/1.14; 700/82
(58) Field of Classification Search .................. 709/201, 709/227
See application file for complete search history.

(56) References Cited

U.S. PATENT DOCUMENTS

2003/0197886 A1 * 10/2003 Fujinaga et al. ............ 358/1.14

2006/0100724 A1 *  5/2006 Miura et al. ................... 700/82

FOREIGN PATENT DOCUMENTS

| JP | 08-324071 A |   | 12/1996 |
|---|---|---|---|
| JP | 2002-041265 A |   | 2/2002 |
| JP | 2002041265 A | * | 2/2002 |
| JP | 2005-117528 A |   | 4/2005 |
| JP | 2005117528 A | * | 4/2005 |

* cited by examiner

*Primary Examiner*—Wing F Chan
*Assistant Examiner*—Andrew Woo
(74) *Attorney, Agent, or Firm*—Canon U.S.A., Inc.; I.P. Division

(57) ABSTRACT

A data processing system includes a wireless terminal and first and second data processing apparatuses. The first data processing apparatus, responsive to receiving from the wireless terminal data including identification information identifying the second data processing apparatus, sends to the second data processing apparatus a shift signal for shifting the second data processing apparatus from a power saving mode incapable of receiving wireless communication data to a standby mode capable of receiving wireless communication data. Further, the second data processing apparatus shifts from the power saving mode to the standby mode responsive to receiving the shift signal from the first data processing apparatus.

8 Claims, 19 Drawing Sheets

FIG.15

| IP ADDRESS _2501_ | HOST NAME _2502_ | POWER SUPPLY STATUS _2503_ |
|---|---|---|
| AAA.BBB.CCC.11 | MFP1 | STANDBY MODE |
| AAA.BBB.CCC.12 | MFP2 | POWER SAVING MODE A |
| AAA.BBB.CCC.13 | MFP3 | POWER SAVING MODE B |
| AAA.BBB.CCC.14 | MFP4 | POWER SAVING MODE A |
| AAA.BBB.CCC.15 | MFP5 | STANDBY MODE |

DATA PROCESSING APPARATUS AND DATA PROCESSING METHOD

BACKGROUND OF THE INVENTION

1. Field of the Invention

The present invention relates to a data processing apparatus and a data processing method.

2. Description of the Related Art

In general, an image forming apparatus, such as a printer or a multifunction peripheral, is provided with a function to shift to a power saving mode, which is low in power consumption, in order to reduce power consumed by the apparatus when the apparatus is not in use during a predetermined period of time. In the power saving mode, the image forming apparatus either stops a power supply to a heat fixing device, which is a main power consuming source, or lowers the temperature of the heat fixing device to a predetermined temperature.

In contrast to this, in recent years, a product realizing power consumption reduction of the heat fixing device itself, such as represented by an on-demand heat fixing device, has been developed, and thus, power consumption reduction of the image formatting apparatus has been advancing.

However, the power consumption of an image forming apparatus is not simply limited to the heat fixing device. Recent image forming apparatuses are mounted with system ASICs (application specific integrated circuits) and other numerous electronic parts in order to perform image processing and system control in the image forming apparatus, and as a result, the power consumed by these electronic parts has increased. Furthermore, because of the speeding up of rasterization of PDL (page description language) data, operating clock frequencies of an image processing ASIC and a CPU are becoming high, and the power consumption tends to further increase. Thus, although some advancements in electronics are beneficial for increasing processing speeds, in many circumstances, the tradeoff is increased power consumption.

Under such circumstances, in the power saving mode, an image forming apparatus is required to perform control to reduce the power supply to electronic parts. Hence, to realize the power consumption reduction, an information technology device adopting a method of supplying power to only a portion which detects the incoming of data in the power saving mode has been developed as represented by a Wake On LAN function of wired LAN (see Japanese Patent Application Laid-Open No. 8-324071).

Such an information technology device performs the power supply to hardware configuring the device upon reception of a packet matching the condition of Wake On LAN from a host computer and the like, thereby waking up the hardware. In the information technology device equipped with the Wake On LAN function, an incoming detecting portion for detecting whether a wake on packet has been received from the host computer is required to be supplied with power in the power saving mode. The power consumption in this case is lower compared to the ordinary operation. Consequently, this is an effective method to realize the power consumption reduction for the whole of an information technology device. In the information technology device introducing such function, it is possible to allow a remote printer or network multifunction peripheral to shift from the power saving mode to a standby mode through the wired LAN.

Further, in recent years, a mobile information technology device, such as a notebook personal computer and the like, corresponding to a wireless LAN using a wireless technology in replacement of the wired LAN has been developed. By appearance of the information technology device sufficiently giving a full play to cordless user-friendliness, ubiquitous environment is being constructed in home and offices. Even in the case of a printer or a multifunction peripheral, which is an image forming apparatus, product development corresponding to the wireless LAN is being aggressively conducted. However, in the case of a network multifunction peripheral or the like which is fixedly installed at a predetermined location of the office as against a mobile information technology device which is freely movable, there still exists a need in terms of enabling communications either by wired or wireless network in order to give versatility to the network connection function.

However, an image forming apparatus which corresponds to both wired and wireless network interfaces is always in search of a link destination of wireless communication in order to establish a network connection with the wireless equipment existing in the distance within a predetermined range. Therefore, it is necessary to supply power to the wireless network interface even in the power saving mode. In this case, the consumption power of the image forming apparatus is presumed to increase due to the communication connection with the wireless equipment.

Therefore, it would be desirable to provide a data processing apparatus and a data processing method directed to realizing power consumption reduction and maintaining user-friendliness in a data processing system configured by a plurality of data processing apparatuses having both wired and wireless network connection functions.

SUMMARY OF THE INVENTION

The present invention has been made in view of the above described disadvantages affiliated with the aforementioned conventional approaches. And in particular, the present invention is directed to realizing power consumption reduction and maintaining user-friendliness in a data processing system configured by a plurality of data processing apparatuses having both wired and wireless network connection functions.

According to an aspect of the present invention, a data processing system is provided which includes a first and second data processing apparatuses on communication via wired network, the first and second data processing apparatuses both also being configured to receive wireless communication data sent from a wireless terminal. The data processing system includes the first data processing apparatus including, a first wireless communication unit configured to receive from the wireless terminal a shift signal for shifting the second data processing apparatus from a first status incapable of receiving the wireless communication data to a second status capable of receiving the wireless communication data; and a first wired communication unit configured to, responsive to the first wireless communication unit receiving the shift signal, send the shift signal for shifting the second data processing apparatus from the first status to the second status to the second data processing apparatus via the wired network; and the second data processing apparatus including, a second wireless communication unit configured to receive wireless communication data from the wireless terminal; a second wired communication unit configured to receive the shift signal sent by the first wired communication unit from the first data processing apparatus via the wired network; and a status shift unit configured to, responsive to the second wired communication unit receiving the shift signal, shift the second data processing apparatus from the first status to the second status.

According to another aspect of the present invention, there is provided a data processing apparatus configured to be in communication with a second data processing apparatus via a wired network, comprising a first wireless communication unit configured to receive from a wireless terminal a shift signal for shifting the second data processing apparatus from a first status incapable of receiving wireless communication data to a second status capable of receiving the wireless communication data, and a first wired communication unit configured to, responsive to the first wireless communication unit receiving the shift signal, send the shift signal for shifting the second data processing apparatus from the first status to the second status to the second data processing apparatus via the wired network.

According to yet another aspect of the present invention, there is provided a data processing method for a data processing system including a wireless terminal, a first data processing apparatus, and a second data processing apparatus, the data processing method including, responsive to the first data processing apparatus receiving from the wireless terminal data including identification information for identifying the second data processing apparatus, sending from the first data processing apparatus to the second data processing apparatus a shift signal for shifting the second data processing apparatus from a first status incapable of receiving wireless communication data to a second status capable of receiving the wireless communication data, and, responsive to the second data processing apparatus receiving the shift signal from the first data processing apparatus, shifting the second data processing apparatus from the first status to the second status.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate numerous embodiments, features and aspects of the present invention and, together with the description, serve to explain the principles of the invention.

FIG. 15 is a view showing an example of a power status management list corresponding to an embodiment of the present invention.

DETAILED DESCRIPTION OF THE EMBODIMENTS

Numerous exemplary embodiments, features and aspects of the present invention will now be herein described in detail below with reference to the drawings.

<Exemplary Image Forming System>

Figure 1:
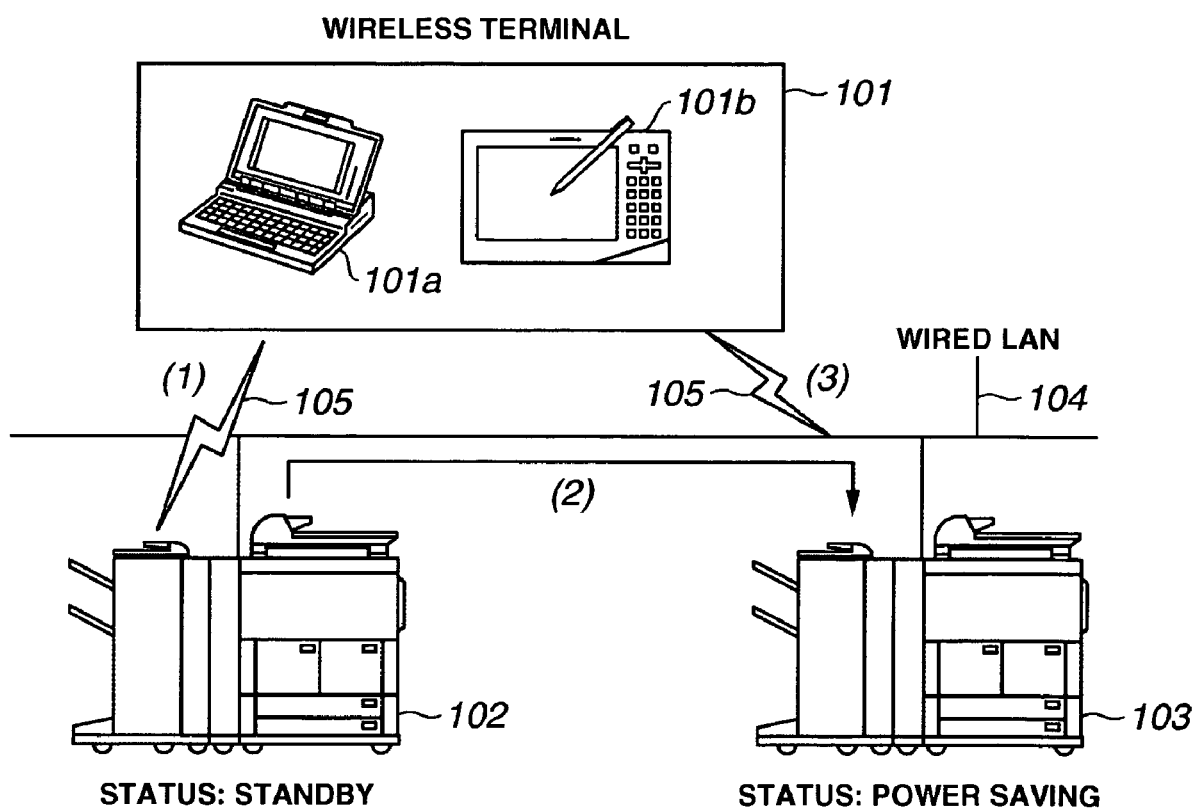
FIG. 1 is a view showing an example of a configuration of an image forming system corresponding to an embodiment of the present invention.

FIG. 1 shows an example of an image forming system configured by a plurality of image forming apparatuses corresponding to an embodiment of the present invention. Reference numeral 101 denotes a wireless terminal. The wireless terminal 101 includes, for example, a lap top type personal computer 101a or a portable type personal information terminal 101b. The aforementioned devices are considered examples, and it is noted that various other types of devices with information processing terminals and of which utilize wireless communication functions may also be considered a wireless terminal. Reference numerals 102 and 103 denote image forming apparatuses, which, for example, correspond to multifunction peripherals such as a laser printer, an ink jet printer or a multifunction peripheral having a printer function, facsimile function, copy function and the like.

FIG. 1 shows a case where the image forming system is configured by two image forming apparatuses. However, the configuration of the system is not limited to this pattern, and the image forming system configured by two or more image forming apparatuses can be also applied to the present invention. Reference numeral 104 denotes a wired LAN (for example, conforming to the standard of Ethernet (registered trademark)), and reference numeral 105 denotes a wireless LAN (for example, conforming to the standard of IEEE802.11 system). Here, the wireless terminal 101 can perform communications through the wireless LAN 105, and both of the image forming apparatuses 102 and 103 have a connecting function of the wired LAN 104 and the wireless LAN 105, and can perform wired communications and wireless communications.

In the image forming system shown in FIG. 1, the wireless terminal 101 can perform communications in an ad hoc mode (a mode in which wireless terminals directly perform data communication with each other) through the wireless LAN 105. Further, the image forming system shown in FIG. 1 can execute processings such as a print out, facsimile sending, and the like by using the image forming apparatuses 102 and 103.

In FIG. 1, the image forming apparatus 102 is in a state (standby mode) in which the apparatus is activated and normally operated. The image forming apparatus 103 has only a part of the configuration of the apparatus supplied with power, and is in a state in which it is not activated as a whole and nor is it normally operated (power saving mode).

More specifically, the image forming apparatus 103 is in the power saving mode, in which power is supplied only to a packet incoming detecting unit inside the apparatus, and a packet can be received through the wired LAN 104. On the contrary, a receiving unit for performing reception through the wireless LAN 105 is not supplied with power, and in this manner, the power consumption is reduced. Consequently, the image forming apparatus 103 cannot directly send and receive data with the wireless terminal 101.

That is, in the standby mode, power is supplied at least to a wired communication unit and a wireless communication unit for performing communications through the wired LAN 104 and the wireless LAN 105. In the power saving mode, power is supplied to the wired communication unit for performing communications through the wired LAN 104, but power is not supplied to the wireless communication unit for performing communications through the wireless LAN 105.

Hence, in the present embodiment, the wireless terminal 101, first, accesses the image forming apparatus 102, which is normally operating in the standby mode, through the wireless LAN 105, and notifies the image forming apparatus 102 that processing is to be performed in the image forming apparatus 103 (step (1)). The image forming apparatus 102, according to this notice, sends a wake on packet to the image formatting apparatus 103 through the wired LAN 104 (step (2)). Here, the wake on packet is packet data for performing a notification to shift an image forming apparatus from the power saving mode to the standby mode. In this manner, the image forming apparatus 103 returns to the standby mode, and therefore, the wireless terminal 101 can perform sending and receiving of print data with the image forming apparatus 103 through the wireless LAN 105 (step (3)).

Thus, in the system corresponding to the embodiment such as that shown FIG. 1, in the environment where two or more image forming apparatuses are connected on the network, at least one image forming apparatus is configured to maintain a power mode capable of performing the wireless LAN communication.

<Exemplary Appearance of Image Forming Apparatus>

Figure 2:
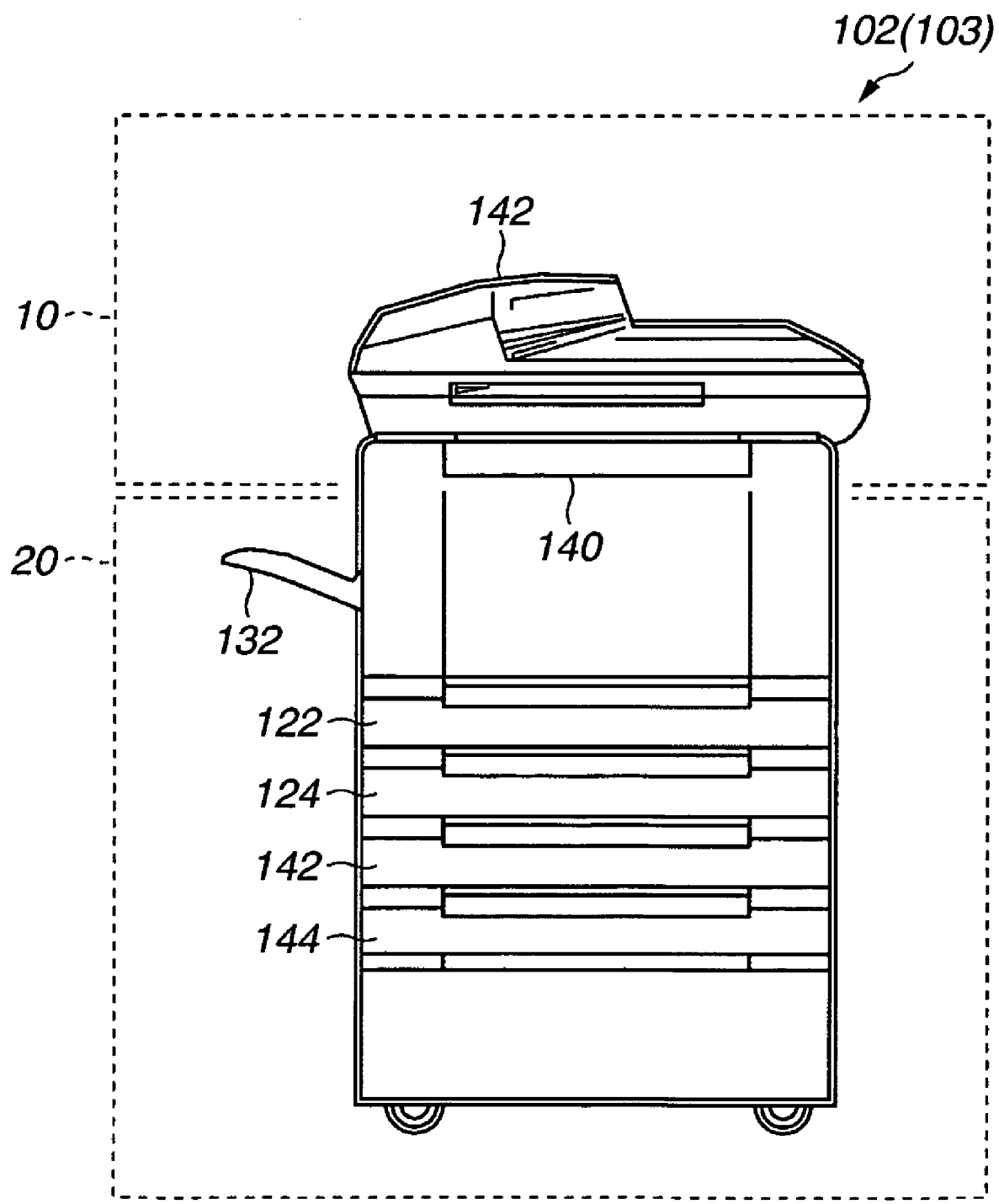
FIG. 2 is a view showing an example of an external configuration of an image forming apparatus corresponding to an embodiment of the present invention.

Next, an example of the appearances of the image forming apparatuses 102 and 103 (hereinafter referred to as "image forming apparatus 102" for ease of explanation) corresponding to the present embodiment will be described with reference to FIG. 2. A scanner 10, which is an image input device, illuminates a document image by a document illuminating lamp, and reads the document image by a CCD line sensor, and converts it into electrical signals, thereby obtaining image data. A document sheet is set in a document feeder (automatic document feeding device) 142, and the device user instructs a reading activation from the operating unit 140, so that the document feeder 142 feeds the document one sheet by one sheet, thereby performing a reading operation of the document image.

A printer unit 20, which is an image output device, is a unit for converting the image data into an image on a sheet, and in the present embodiment, the printer unit 20 will be described as a printer unit based on an electrophotographic system using a photosensitive drum or a photosensitive belt. However, for the printer unit 20, an ink jet system and the like, which directly print an image on a sheet by ejecting ink droplets from a fine nozzle array may be adopted. The activation of the printing operation is started by the instructions from a controller (to be described later) inside the apparatus. In the printer unit 20, a plurality of paper feeding stages are provided so that different paper size or different aspect of the paper can be selected, and corresponding paper cassettes 122, 124, 142, and 144 are provided. The sheet on which an image is formed is discharged onto a discharge tray 132.

Next, an example of an inner configuration of the image forming apparatus 102 shown in FIG. 2 will be described with reference to a sectional view shown in FIG. 3. In the scanner unit 10 of FIG. 3, reference numeral 901 denotes a document board glass 901, on which the document fed from the document feeder 142 is mounted in order at a predetermined position. Reference numeral 902 denotes a document illuminating lamp, for example, configured by a halogen lamp, and exposes the document mounted on the document board glass 901. Reference numerals 903, 904, and 905 denote scanning mirrors, which are stored in an optical scanning unit (not shown), and while making reciprocating motions, guides reflecting light from the document to a CCD unit 906. The CCD unit 906 is configured by an image forming lens 907 for image-forming reflected light from the document on a CCD (charge-coupled device), an image pickup device configured by a CCD image sensor, a CCD driver 909 for driving the image pick-up device 908, and the like. An image signal output from the image pick-up device 908, for example, after being converted into digital data of 8 bits, is input to a controller unit 939. The controller unit 939 includes a microcomputer, an image processing unit, and the like, which are to be described later, and performs an image forming operation according to the instructions from the operating unit 140 receiving the operation from the user.

Figure 3:
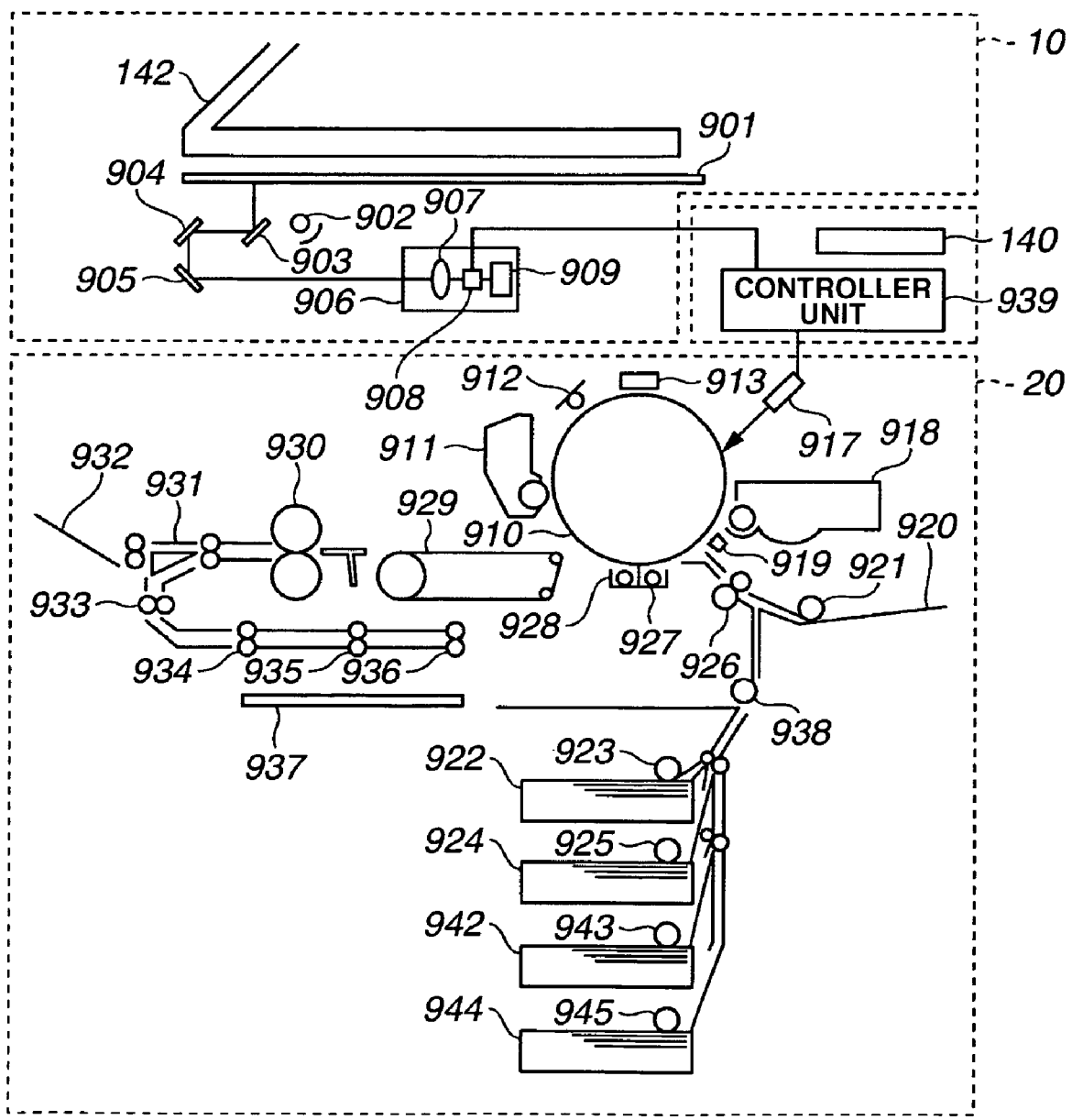
FIG. 3 is a view showing an example of an internal configuration of the image forming apparatus corresponding to an embodiment of the present invention.

Next, in the printer unit 20 of FIG. 3, reference numeral 910 denotes a photosensitive drum, which is removed from charge by a pre-exposure lamp 912 in preparation for an image formation. Reference numeral 913 denotes a primary charging device, which uniformly charges the photosensitive drum 910. Reference numeral 917 denotes an exposing unit, which is, for example, configured by a semiconductor laser and the like, and exposes the photosensitive drum 910 based on the image data processed by the controller unit 939 performing control of the image formation and the whole apparatus, and forms an electrostatic latent image on the photo sensitive drum 910. Reference numeral 918 denotes a developing device, in which black developer (toner) is stored. Reference numeral 919 denotes a pre-transfer charging device, which is applied with a high voltage before transferring a toner image developed on the photosensitive drum 910 onto a sheet.

Reference numerals 920, 922, 924, 942, and 944 denote sheet feeding units (reference numeral 920 denotes a manual type sheet feeding unit), into which transfer sheets are fed by the driving of each of the feeding rollers 921, 923, 925, 943, and 945, and stop once at an installed position of a registration roller 926, and are fed out again in writing timing with the image formed on the photosensitive drum 910. Reference numeral 927 denotes a transfer charging device, which transfers the toner image developed on the photosensitive drum 910 onto a transfer sheet to be fed out. Reference numeral 928 denotes a separating charging device, which separates a transfer sheet having completed a transfer operation from the photosensitive drum 910. The toner remaining on the photosensitive drum 910 without being transferred is recovered by a cleaner 911. Reference numeral 929 denotes a conveying belt, which conveys a transfer sheet having completed a transferring process to a fixing device 930. The fixing device 930 fixes a toner transferred on the transfer sheet, for example, by heat. Reference numeral 931 denotes a flapper, which controls a conveyance path of the transfer sheet having completed a fixing process to the installed direction of either a sorter 932 or an intermediate tray 937.

Reference numerals 933 to 936 denote sheet feeding rollers, which convey the transfer sheet having completed the fixing process once to the intermediate tray 937 while turning (for multiple printing) or reversing (for two-sided printing) the sheet. Reference numeral 938 denotes a re-feeding roller, which conveys again the transfer sheet mounted on the intermediate tray 937 up to the installed position of the registration roller 926.

<Exemplary Controller Unit>

Next, referring to FIG. 4, an example of the configuration of the controller unit 939 in FIG. 3 will be described. The controller unit 939 connects to the scanner unit 10, which is an image input device, and the printer unit 20, which is an image output device. Further, the controller unit 939 connects to the wired LAN 104 and a wide area network (WAN) 1251, thereby serving as a control unit for performing the input and output of image information or device information.

Figure 4:
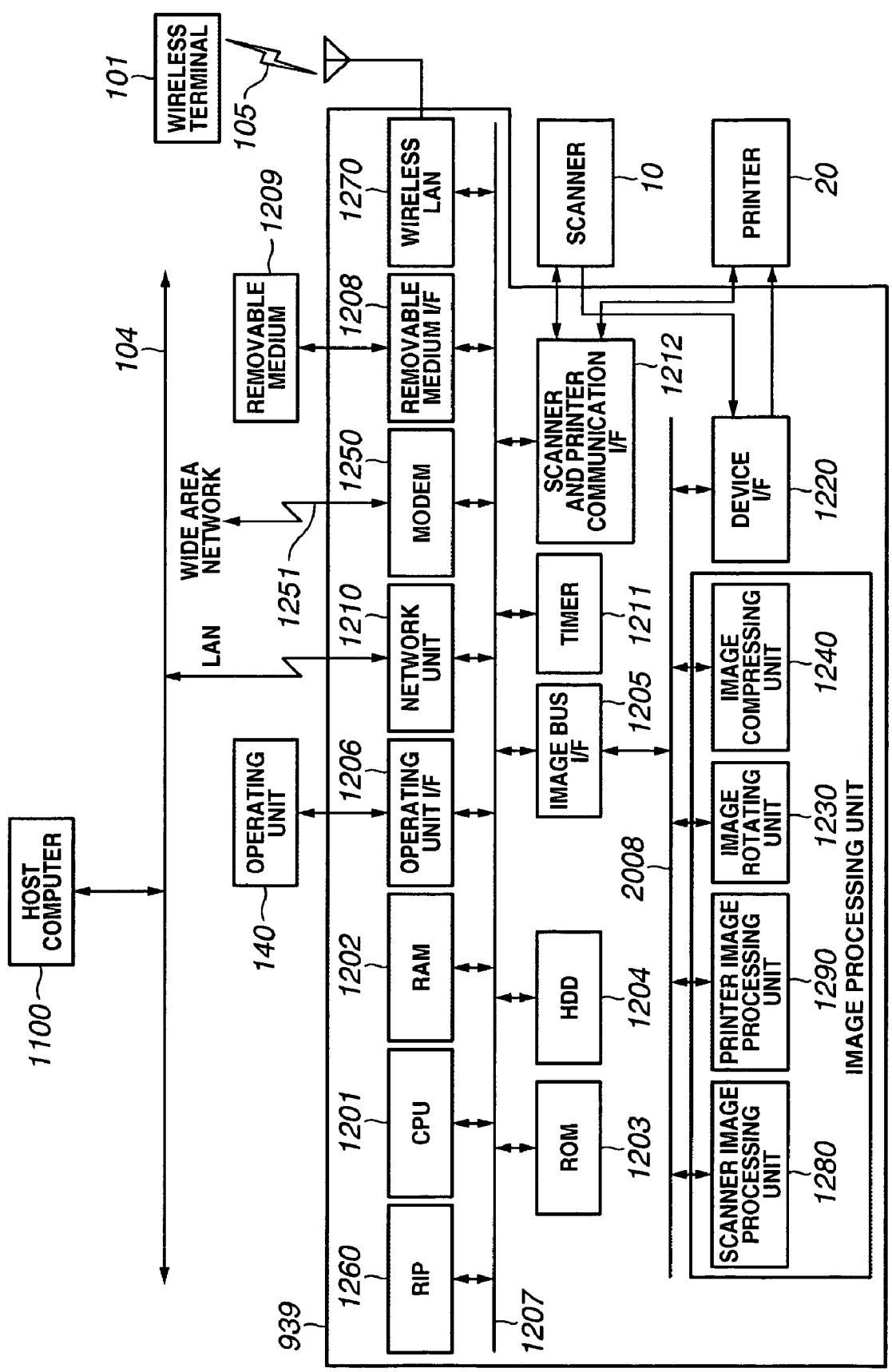
FIG. 4 is a view showing an example of a configuration of a controller unit of the image forming apparatus corresponding to an embodiment of the present invention.

In FIG. 4, a CPU 1201 is a control unit for controlling the whole of the image forming apparatus 102. A RAM 1202 is a work memory for allowing the CPU 1201 to operate, and is also an image memory for temporarily storing image data. A ROM 1203 is a boot ROM, in which a boot program of the image forming apparatus 102 is stored.

An HDD 1204 is a hard disc drive, and stores system software, image data, a software counter value, and the like. The software counter value is provided with a counter region for each sheet size and a counter region for each data processing capacity. Based on the number of image output sheets and data volume processed by the CPU 1201, a count-up is performed by calculating with an arbitrary standard volume value set in advance as a reference. The counter value may have its storage region not limited to the HDD 1204, but also in an EEPROM and the like if it is capable of storing and retaining the value even when the power supply is cut off.

An operating unit I/F (interface) 1206 is an interface unit with an operating unit (UI: user interface) 140, and outputs image data to be displayed in the operating unit 140. Further, the operating unit I/F 1206 plays a role of sending information input by the user of the present system via the operating unit 140 to the CPU 1201. A network unit 1210 connects to the wired LAN 104, and performs the input and output of image data and information relating to equipment control. Further, responsive to the input operation in the operating unit 140, the network unit 1210 receives output image data according to the input operation by the operating unit 140 from a host computer 1100 or an output image data management device (not shown) on the wired LAN 104, and performs an image output. The network unit 1210 has a packet incoming detecting unit for detecting the incoming of a packet through the wired LAN 104.

A wireless LAN 1270 is a wireless sending and receiving unit performing wireless communications with a wireless terminal 101 capable of performing the wireless LAN communication. A modem 1250 connects to the wide area network 1251, and performs the input and output of information. A scanner and printer communication I/F (interface) 1212 is an interface for performing communications with the CPUs of the scanner 10 and the printer 20. A raster image processor (RIP) 1260 rasterizes PDL (page description language) code into a bit map image. The above-described devices are disposed on a system bus 1207.

A timer 1211 performs a time setting of the image forming apparatus 102 and the controller unit 939 and functions as a timer offering an interruption for every cycle of a predetermined period of time. An image bus I/F 1205 connects the system bus 1207 to an image bus 2008 for sending image data at high speed, and serves as a bus bridge for converting a data configuration. The image bus 2008 is configured by a PCI bus, an IEEE 1394 bus or the like.

On the image bus 2008, the following devices are disposed. A device I/F (interface) unit 1220 connects the scanner unit 10 and the printer unit 20 to the controller 939, and performs synchronous or asynchronous conversion of image data. A scanner image processing unit 1280 performs a correction, process, and editing for input image data. A printer image processing unit 1290 performs a correction, resolution conversion, and the like for print output image data. An image rotating unit 1230 performs a rotation of image data. An image compressing unit 1240 performs a compression and decompression processing of JPEG for multi-valued image data and a compression and decompression processing of JBIG, MMR, or MH for binary image data.

A removable medium IF 1208 is an external interface capable of writing and reading to a removable medium 1209 such as an IC card, a CD-ROM, a mobile hard disk, and the like. The removable medium IF 1208 supports various types of media, including USB, PCMCIA, DVD drive, and the like.

In the present embodiment, when the image forming apparatus 102 is put into the power saving mode, power is supplied to at least the packet incoming detecting unit of the network unit 1210 and the RAM 1202. This is because, usually, initialization data of a device is backed up by the RAM 1202 in order to speed up the return to the standby mode. Further, if the shift to the standby mode from the power saving mode is made possible based on the operation of the operating unit 140, it is desirable to supply power also to the operating unit 140.

<Exemplary Scanner Image Processing Unit>

Figure 5:
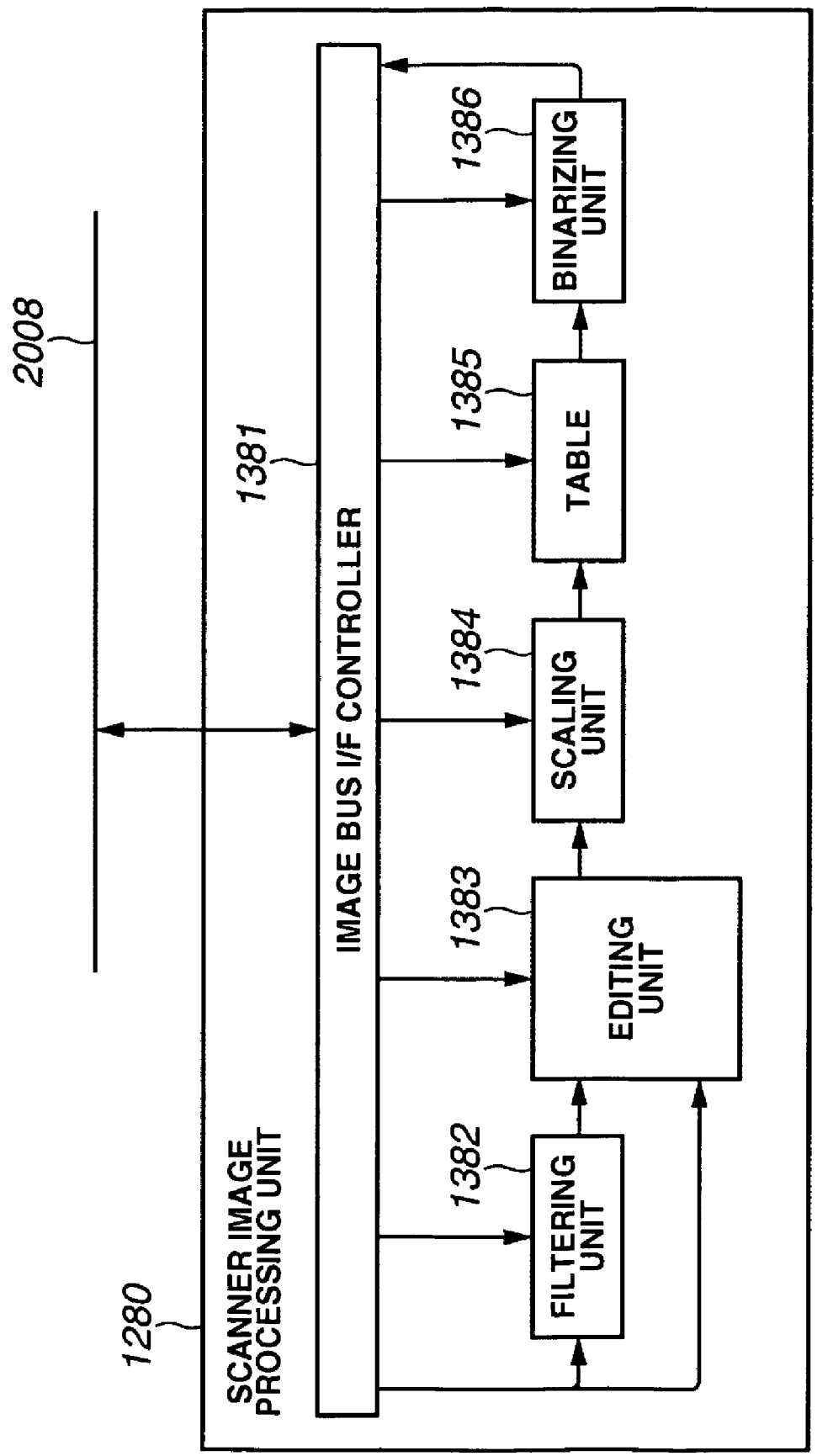
FIG. 5 is a view showing an example of a configuration of a scanner image processing unit according to an embodiment of the present invention.

Next, referring to FIG. 5, an example of the configuration of the scanner image processing unit 1280 in FIG. 4 will be described. In FIG. 5, an image bus IF controller 1381 connects to the image bus 2008 so as to control its bus access sequence, and controls operation and timing of each device inside the scanner image processing unit 1280. A filtering unit 1382 performs a convolution calculation using a spatial filter. An editing unit 1383 recognizes, for example, a closed region surrounded by a marker pen from input image data, and performs an image process processing such as shadowing, half-tone dot meshing, negative-positive reversal, and the like for image data inside the closed region.

A scaling unit 1384 performs an interpolation calculation regarding the main scanning direction of a raster image when resolution of a read image is changed, and performs enlarging or reducing of the image. The scaling in the sub-scanning direction is effected by changing the speed of scanning of an image reading line sensor (not shown). A table 1385 is used for a table conversion performed for converting image data which is read luminance data into density data. A binarizing unit 1386 binarizes multi-valued gray scale image data by an error diffusing processing or a screen processing. The image data having completed the processing is transferred again onto the image bus 2008 through the image bus controller 1381.

<Exemplary Printer Image Processing Unit>

Figure 6:
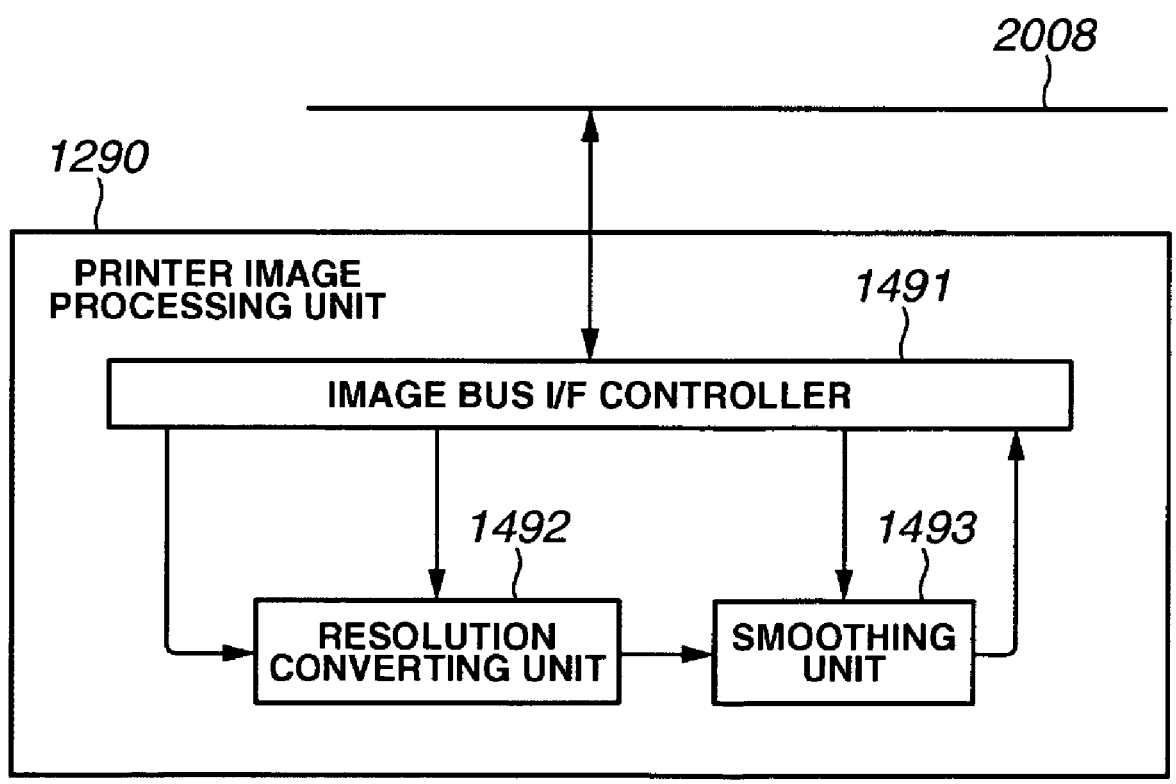
FIG. 6 is a view showing an example of a configuration of a sprinter image processing unit corresponding to an embodiment of the present invention.

Next, referring to FIG. 6, an example of the configuration of the printer image processing unit 1290 in FIG. 4 will be described. In FIG. 6, an image bus I/F controller 1491 connects to the image bus 2008 so as to control its bus access sequence, and controls operation and timing of each device inside the scanner image processing unit 1280. A resolution converting unit 1492 performs a resolution conversion for converting image data acquired through the wired LAN 104 or the wide area network 1251 into a resolution for the printer unit 20. A smoothing unit 1493 performs a processing for smoothing jaggies (crudeness of an image appearing in the black and white boundaries such as diagonal lines) of image data after the resolution conversion.

<Exemplary Image Compressing Unit>

Figure 7:
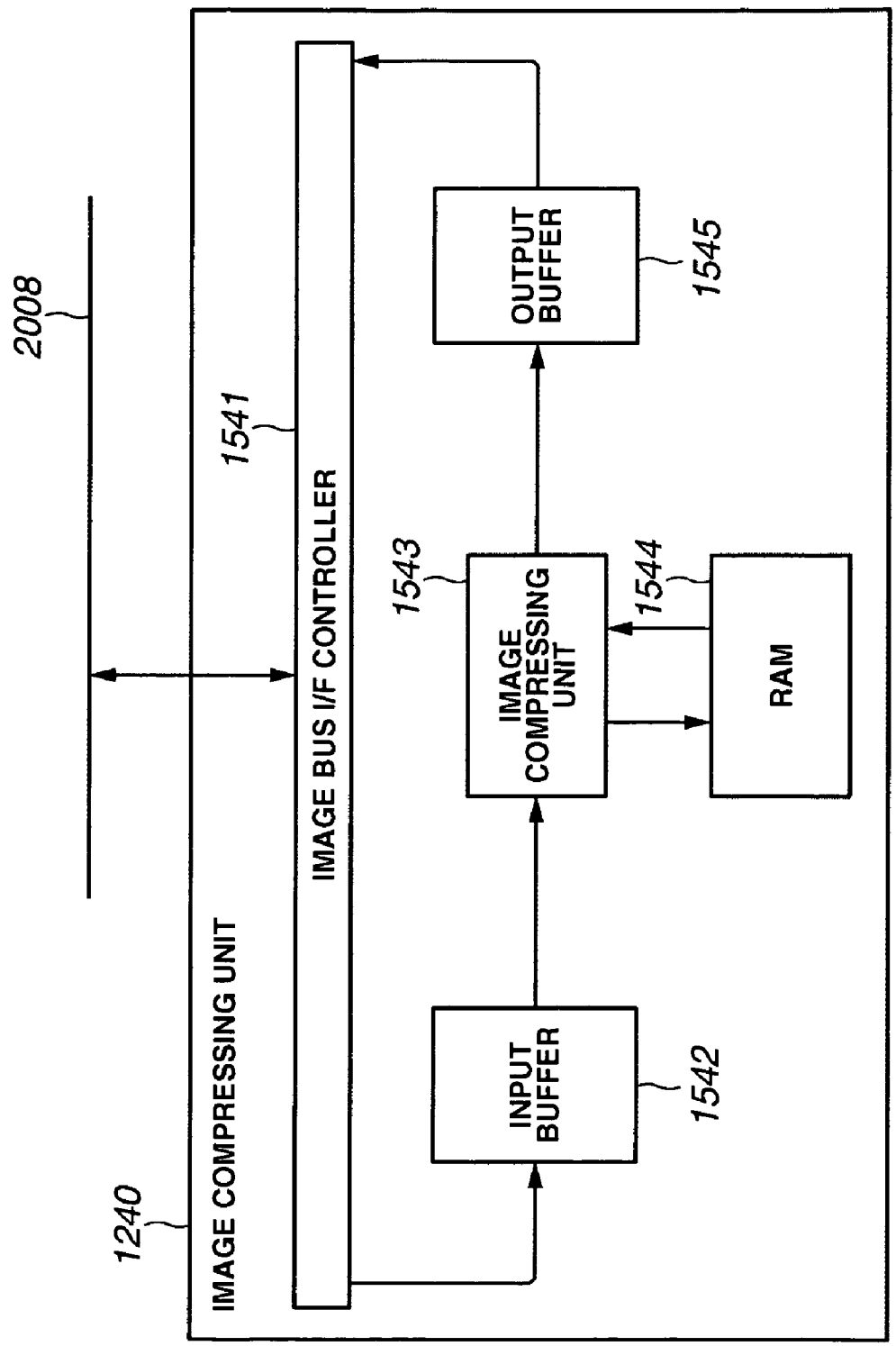
FIG. 7 is a view showing an example of a configuration of an image compressing unit corresponding to an embodiment of the present invention.

Next, referring to FIG. 7, an example of the configuration of the image compressing unit 1240 in FIG. 4 will be described. In FIG. 7, an image bus I/F controller 1541 connects to the image bus 2008 so as to control its bus access sequence, and performs a timing control for exchanging data with an input buffer 1542 and an output buffer 1545, and a control such as setting up a mode for an image compressing unit 1543.

A setting of the image compression control is performed for the image bus I/F controller 1541 from the CPU 1201 through the image bus 2008. By this setting, the image bus I/F controller 1541 performs a setting (for example, MMR compression, JBIG decompression, and the like) necessary for image compression for the image compressing unit 1543. After performing the necessary setting, a permission of the sending of image data is issued to the image bus I/F controller 1541 from the CPU 1201 again.

According to this permission, the image bus I/F controller 1541 starts sending the image data from each device on the RAM 1202 or the image bus 2008. The image data received by the image bus I/F controller 1541 is temporarily stored in the input buffer 1542, and is then transferred at a constant speed according to an image data request from the image compressing unit 1543. At this time, the input buffer 1542 determines whether the image data can be transferred between the image bus I/F controller 1541 and the image compressing unit 1543. If the reading of the image data from the image bus 2008 and the writing of the image data to the image compressing unit 1543 are impossible, the input buffer 1542 performs a control not performing the transfer of the data (hereinafter, such control is referred to as a hand shake).

The image compressing unit 1543 temporarily stores the received image data in a RAM 1544. This is because, when the compression is performed, data for several lines is required depending on the types of the image compressing processing to be performed, and in order to perform the compression for the initial one line, image data for several lines is required to be stored in advance. The image data subjected to the image compression is immediately sent to the output buffer 1545. In the output buffer 1545, a hand shake between the image bus I/F controller 1541 and the image compressing unit 1543 is performed, so that the image data is transferred to the image bus I/F controller 1541.

In the image bus I/F controller 1541, the transferred compressed (or decompressed) image data is transferred to the RAM 1202 or each device on the image bus 2008. Such a series of processings is repeated until a processing request from the CPU 1201 is suspended (when the processing of a required number of pages is terminated) or a stop request from the image compressing unit 1240 is issued (when an error occurs during compressing or decompressing).

<Exemplary Image Rotating Unit)

Figure 8:
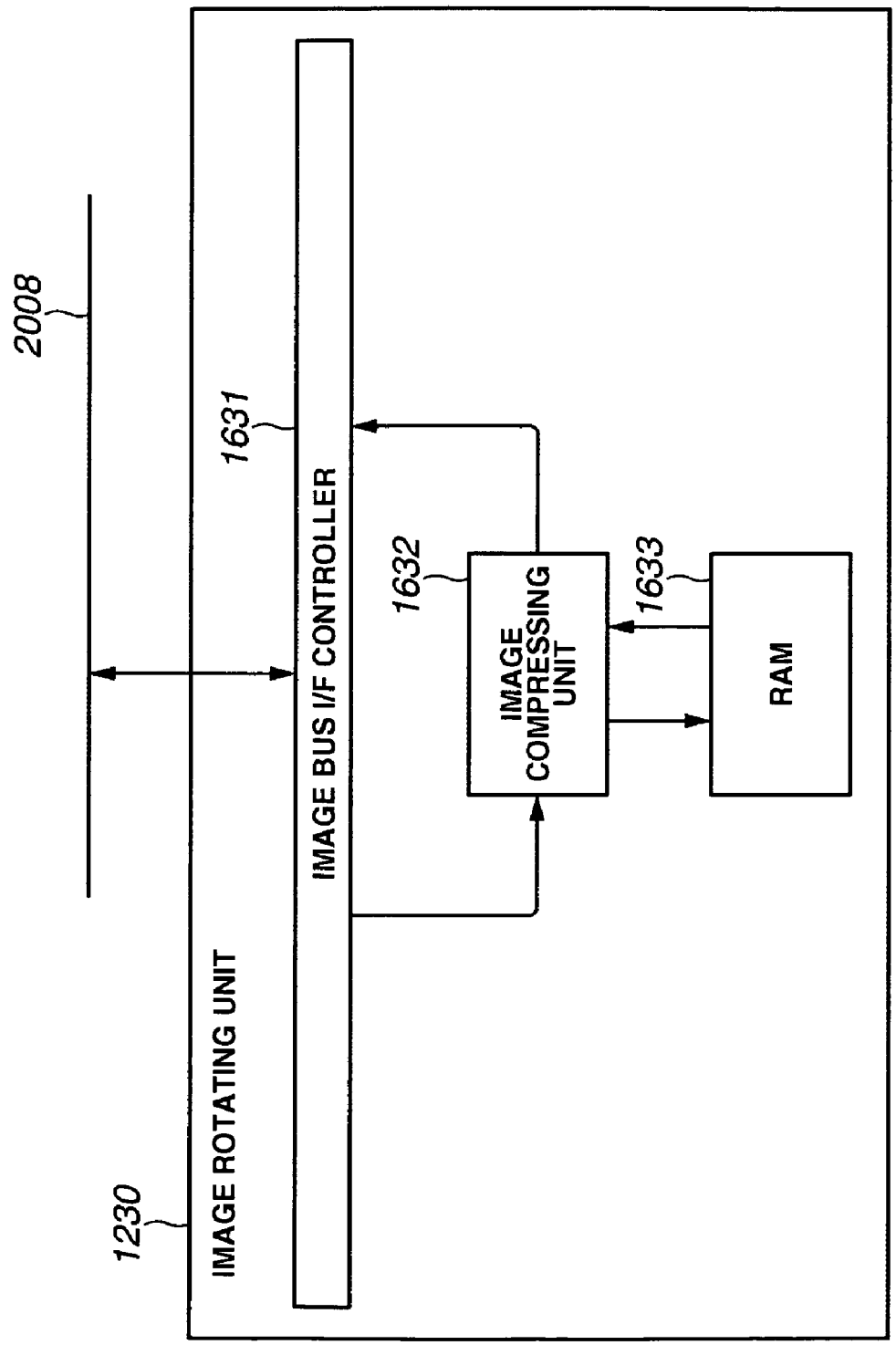
FIG. 8 is a view showing an example of a configuration of an image rotating unit corresponding to an embodiment of the present invention.

Next, referring to FIG. 8, an example of the configuration of the image rotating unit 1230 in FIG. 4 will be described. An image bus I/F controller 1631 connects to the image bus 2008 so as to control its bus sequence, and performs control for setting a mode and the like in an image rotating unit 1632 and timing control for transferring image data to the image rotating unit 1632.

A setting for controlling the image rotation is performed for the image bus I/F controller 1631 by the CPU 1201 via the image bus 2008. By this setting, the image bus I/F controller 1631 performs a setting (for example, an image size, a rotational direction and angle, and the like) necessary for the image rotation for the image rotating unit 1632. After the necessary setting, a permission of sending of image data is issued to the image bus I/F controller 1631 from the CPU 1201 again.

According to this permission, the image bus I/F controller 1631 starts sending image data from the RAM 1202 or each device on the image bus 2008. Here, the imaged size to be rotated is made 32×32 (bits) as shown by reference numeral 1701 in FIG. 9, and when the image data is transferred onto the image bus 2008, image transferring with 32 bits as a unit is performed (an image to be handled is supposed to be binary).

Figure 9:
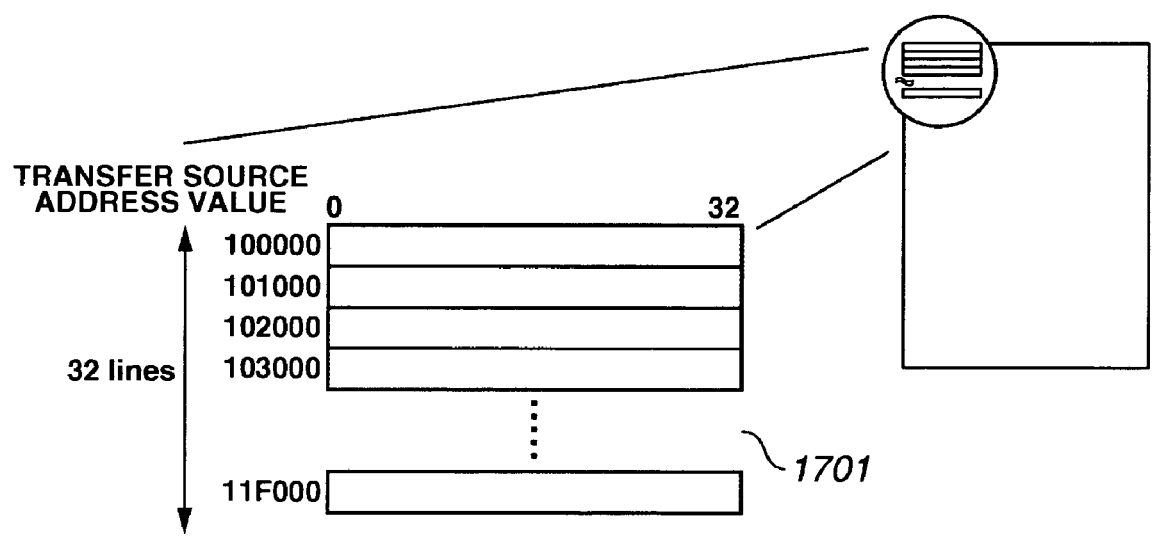
FIG. 9 is a view illustrating image rotating exemplary processing corresponding to an embodiment of the present invention.
Figure 10:
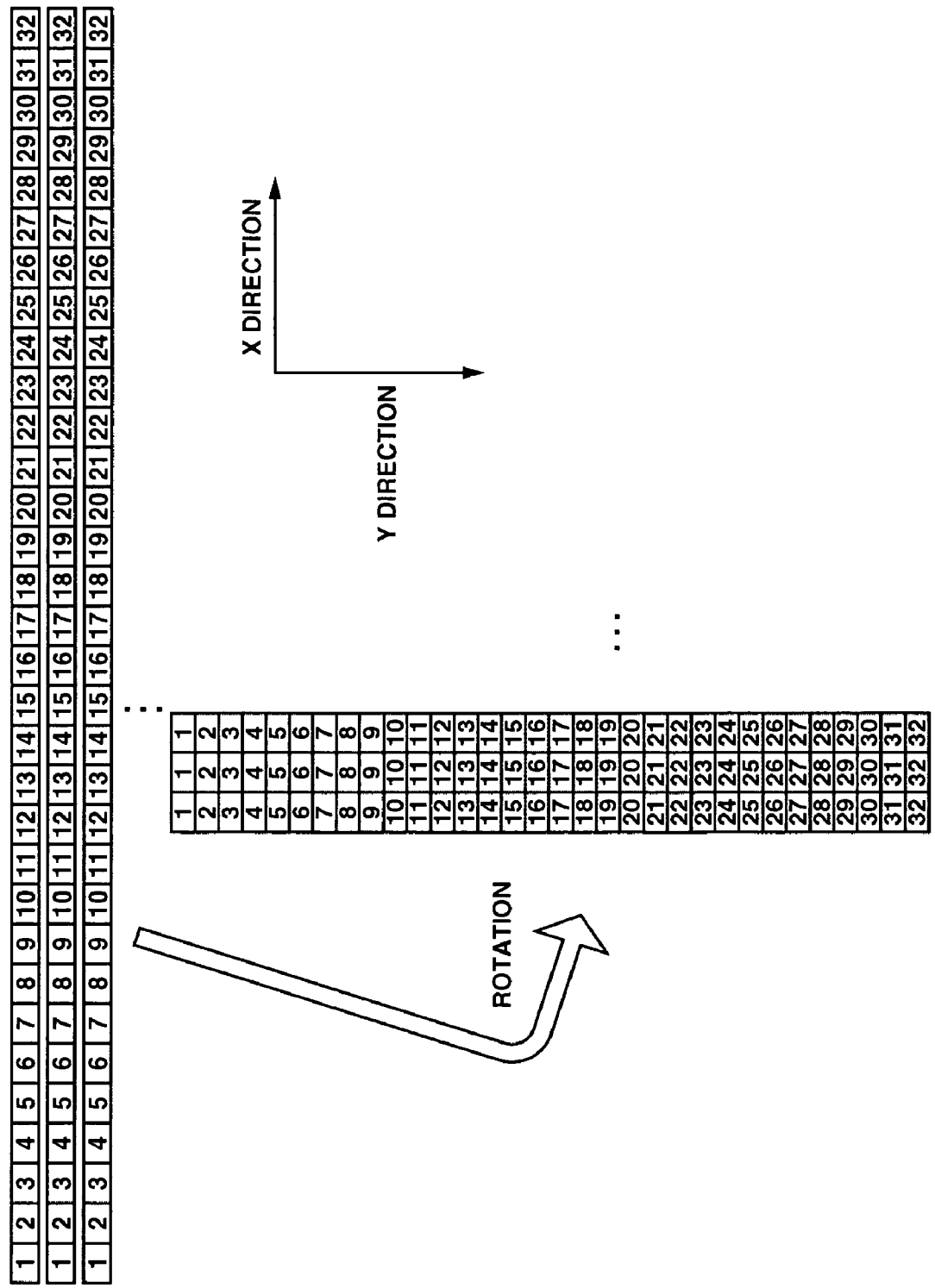
FIG. 10 is a view illustrating exemplary image rotating processing corresponding to an embodiment of the present invention.

As described above, in order to obtain a 32×32 (bits) image, it is necessary to perform the above-described unit data transferring 32 times, and moreover, it is necessary to transfer the image data from discontinuous addresses (see FIG. 9). The image data transferred by discontinuous addressing is written into a RAM 1633 in such a manner as to be rotated at a desired angle at the time of reading. For example, in the case of a 90 degree counterclockwise rotation, image data of 32 bits transferred first in the X direction is written in the Y direction, as shown in FIG. 10. When this image data is read out in the X direction at the time of reading, the image is rotated.

After the 32×32 (bits) image rotation (writing into the RAM 1633) is completed, the image rotating unit 1632 reads the image data from the RAM 1633 by the above-described reading method, and transfers the image to an image bus I/F controller 1631. The image bus I/F controller 1631 having received the image data subjected to the rotation processing transfers data to the RAM 1202 or each device on the image bus 2008 by continuous addressing.

Such a series of processings is repeated until a processing request from the CPU 1201 is suspended (when the processing of a required number of pages is completed).

<Exemplary Device I/F>

Figure 11:
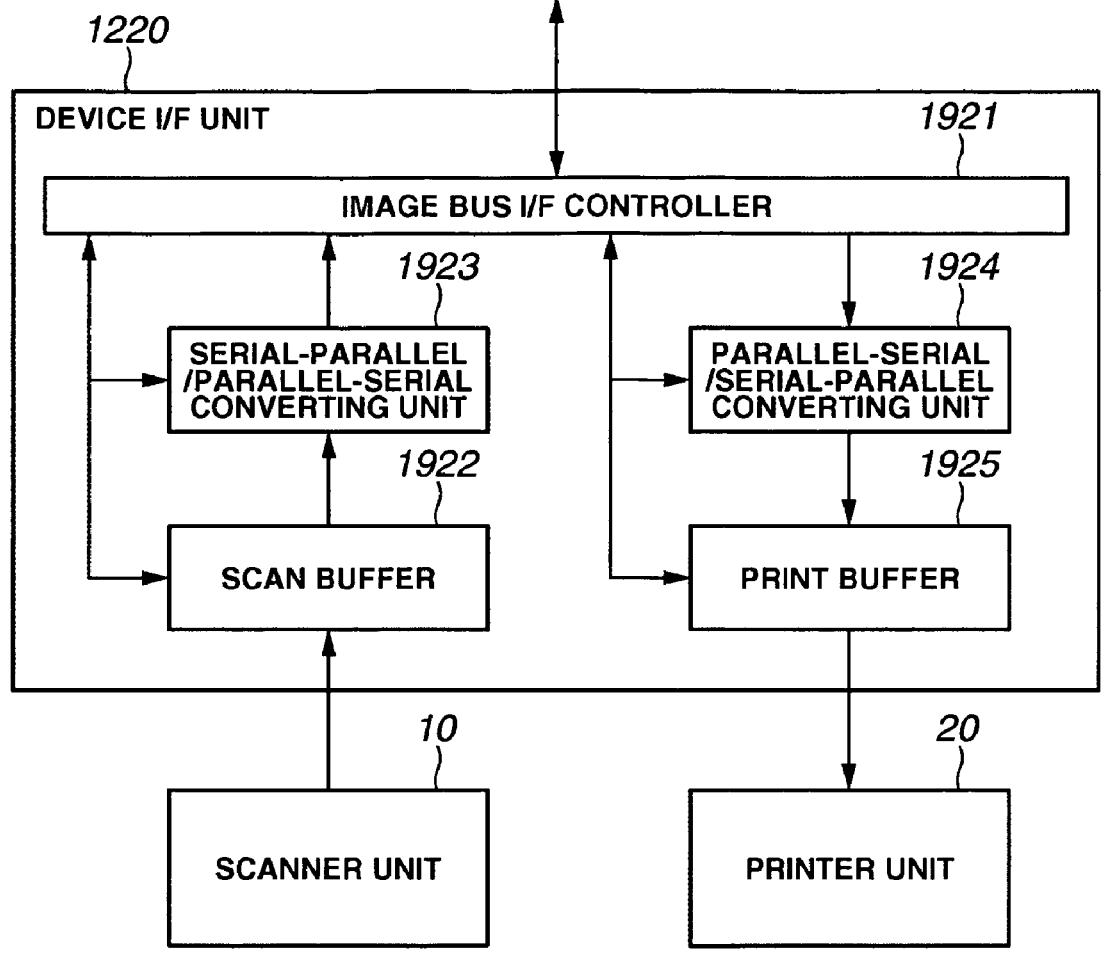
FIG. 11 is a view showing an exemplary configuration of a device I/F unit corresponding to an embodiment of the present invention.

Next, referring to FIG. 11, an example of the configuration of the device I/F 1220 in FIG. 4 will be described. In FIG. 11, an image bus I/F controller 1921 connects to the image bus 2008 so as to control its bus access sequence, and controls operation and timing of each device inside the device I/F 1220. The image bus I/F controller 1921 further generates a control signal to the scanner unit 10 and the printer unit 20. A scan buffer 1922 temporarily stores the image data sent from the scanner unit 10, and outputs the image data while allowing the image data to be synchronized with the image bus 2008. A serial-parallel/parallel-serial converting unit 1923 serializes or disassembles the image data stored in the scan buffer 1922 so as to convert the image data into a data width available for transfer to the image bus 2008.

A parallel-serial/serial-parallel converting unit 1924 disassembles or serializes the image data sent from the image bus 2008 so as to convert the image data into a data width available for storage in a print buffer 1925. The print buffer 1925 temporarily stores the image data sent from the image bus 2008, and outputs the image data while synchronizing the image data with the printer unit 20.

An exemplary processing procedure at the time of image scanning will be described below. First, the image data sent from the scanner unit 10 is synchronized with the timing signal sent from the scanner unit 10, and is stored in the scan buffer 1922. If the image bus 2008 is a PCI bus, when the image data is stored more than 32 bits in the scan buffer 1922, the image data is sent for 32 bits by the first-in first-out (FIFO) system from the scan buffer 1922 to the serial-parallel/parallel-serial converting unit 1923. The serial-parallel/parallel-serial converting unit 1923 converts the image data into image data of 32 bits, and transfers the image data to the image bus 2008 through the image bus I/F controller 1921. Further, if the image bus 2008 is an IEEE 1394 bus, image data stored in the scan buffer 1922 is sent from the scan buffer 1922 to the serial-parallel/parallel-serial converting unit 1923 by the FIFO system. Further, the serial-parallel/parallel-serial converting unit 1923 converts the image data into serial image data, and transfers the image data to the image bus 2008 through the image bus I/F controller 1921.

Next, an exemplary processing procedure at the time of image printing will be described below. If the image bus 2008 is a PCI bus, the image data of 32 bits sent from the image bus 2008 is received by the image bus I/F controller 1921, and is sent to the serial-parallel/parallel-serial converting unit 1924. The serial-parallel/parallel-serial unit 1924 disassembles the image data into image data corresponding to the number of input data bits of the printer unit 20, and stores the image data in the print buffer 1925. Further, if the image bus 2008 is an IEEE 1394 bus, the serial image data sent from the image bus 2008 is received by the image bus I/F controller 1921, and is sent to the parallel-serial/serial-parallel converting unit 1924. The parallel-serial/serial-parallel converting unit 1924 converts the image data into image data corresponding to the number of input data bits of the printer unit 20, and stores the image data in the printer buffer 1925. The parallel-serial/serial-parallel converting unit 1924 synchronizes the image data with the timing signal sent from the printer unit 20 and sends the image data stored in the print buffer 1925 to the printer unit 20 by the FIFO system.

<Exemplary Operating Unit>

Figure 12:
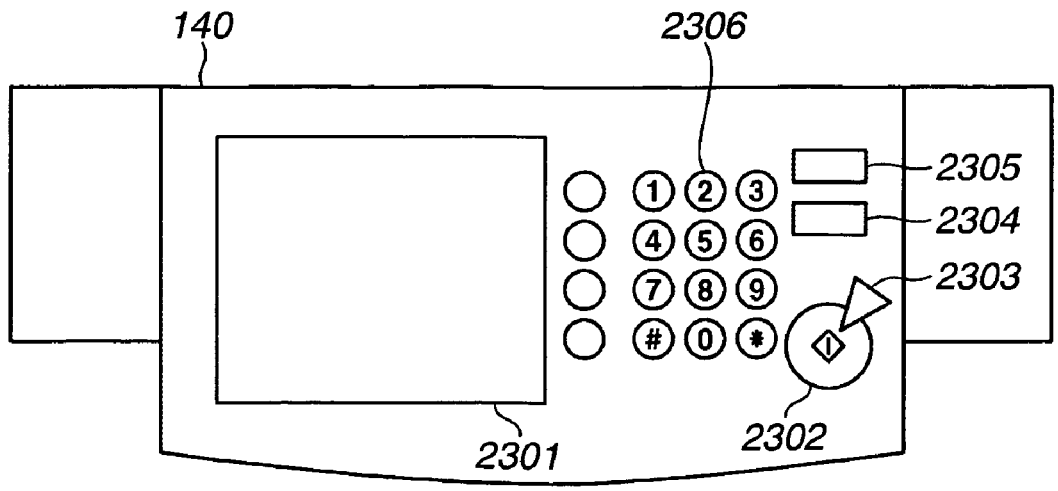
FIG. 12 is a view showing an example of an operating unit corresponding to an embodiment of the present invention.

Next, an example of a configuration of the operating unit 140 shown in FIGS. 2, 3, and 4 will be described with reference to FIG. 12. In the configuration of the operation unit 140 shown in FIG. 12, reference numeral 2301 denotes a liquid crystal operating panel, which is configured to be combined with a touch panel in the liquid crystal, and is capable of displaying a setting content, a soft key, and the like. Reference numeral 2302 denotes a start key, which is a hard key for starting and instructing a copy operation, and the like, in which green and red LEDs are incorporated. The start key 2302 turns on green when the copy operation and the like can start, and turns on red when the copy operation and the like cannot start. Reference numeral 2303 denotes a stop key, which is a hard key used to stop the operation of the image formation apparatus 102. Reference numeral 2306 denotes a group of hard keys, in which numeric keys, a clear key 2305, a reset key 2304, a guide key, and a user mode key are provided.

<Exemplary Liquid Crystal Panel Display During Copy Operation Mode>

Figure 13:
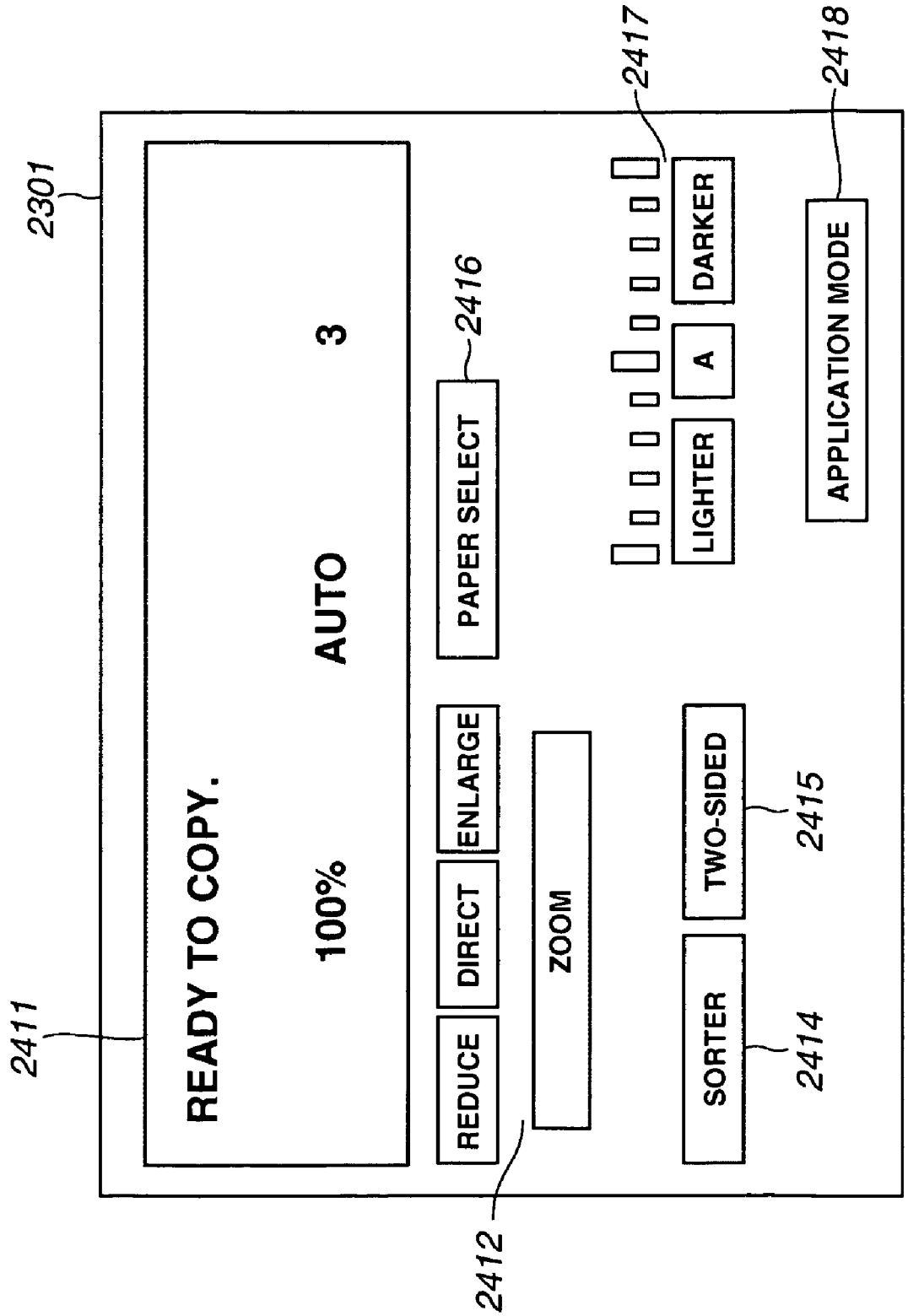
FIG. 13 is a view showing a display example in the operating unit corresponding to an embodiment of the present invention.

Next, referring to FIG. 13, an example of a display status in the crystal liquid operating panel 2301 in FIG. 12 will be described. FIG. 13 shows a status in which an ordinal copy screen is displayed. In FIG. 13, reference numeral 2411 denotes a setting display unit, in which the current operating situation of a digital multifunction peripheral, a scaling factor setup, a type of sheet, and the number of copies are displayed. Reference numeral 2412 denotes a group of scaling factor soft keys, in which keys for direct size, enlarge, reduce, and zoom, which are soft keys regarding the scaling factor during copying, are provided. The direct size key is pressed when a copy scaling factor is made 100%. The reduce key and the enlarge key are pressed when the scaling up and scaling down to fixed sizes is performed. The zoom key is pressed when the scaling down and scaling up to unfixed sizes is made at increments of 1%.

Reference numeral 2414 denotes a sorter key, which is used when a processing method for output sheets is designated. Reference numeral 2415 denotes a two-sided copy key, which is used when two-sided printing is involved in the document or the output method. Reference numeral 2416 denotes a paper select key, which is used when shifting to a screen for designating a size, color, material and the like of the output sheet. Reference numeral 2417 denotes a group of density designating keys, which are used to adjust density of a read or output image and display the setting content. Reference numeral 2418 denotes an application mode key, which is used when shifting to an application mode screen.

<Exemplary Wireless Terminal>

Figure 20:
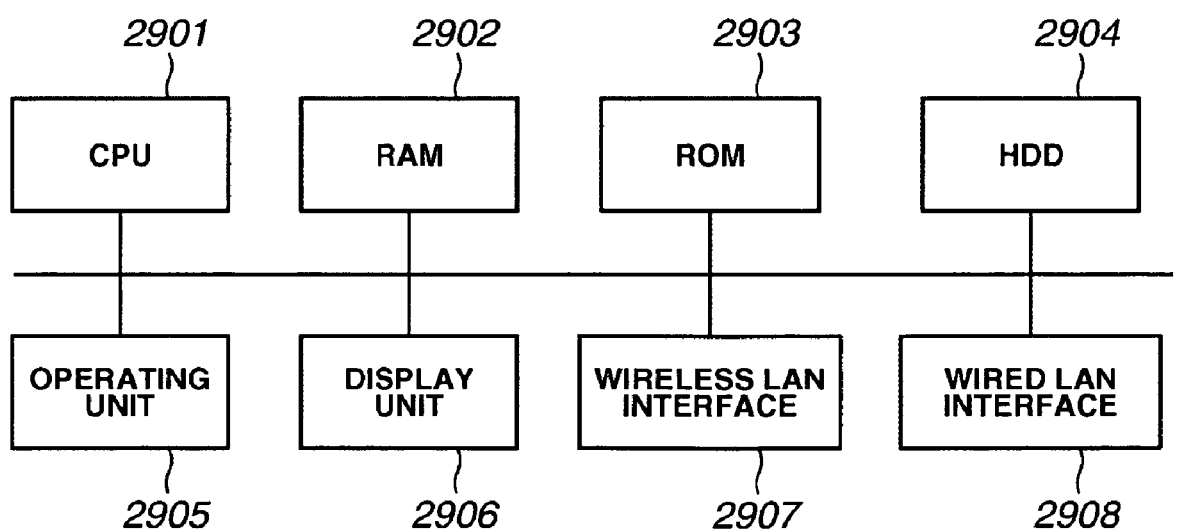
FIG. 20 is a view showing an example of a configuration of the wireless terminal corresponding to an embodiment of the present invention.

FIG. 20 shows an outline of an exemplary hardware configuration of the wireless terminal 101. In FIG. 20, reference numeral 2901 denotes a CPU, which is a control unit for controlling the whole of the wireless terminal 101. Reference numeral 2902 denotes a RAM, which is a work memory for allowing the CPU 2901 to operate. Reference numeral 2903 denotes a ROM, in which a boot program of the wireless terminal 101 is stored. Reference numeral 2904 denotes a hard disk drive (HDD), which stores system software, application data, and the like. Reference numeral 2905 denotes an operating unit, which is configured by a keyboard and a mouse, or a point pad, for accepting an instruction from the user of the wireless terminal 101. Reference numeral 2906 denotes a display unit. Reference numeral 2907 denotes a wireless LAN interface, which is a communication unit for performing communications through the wireless LAN 105. Further, reference numeral 2908 denotes a wired LAN interface, which is a communication unit for performing communications through the wired LAN 104.

<Exemplary Flowchart Showing Transition of Power Supply Status>

Next, exemplary processing corresponding to the present embodiment will be described with reference to the flowchart of FIG. 14 which shows an example of the transition of the power supply status in the image forming apparatuses 102 and 103.

Figure 14:
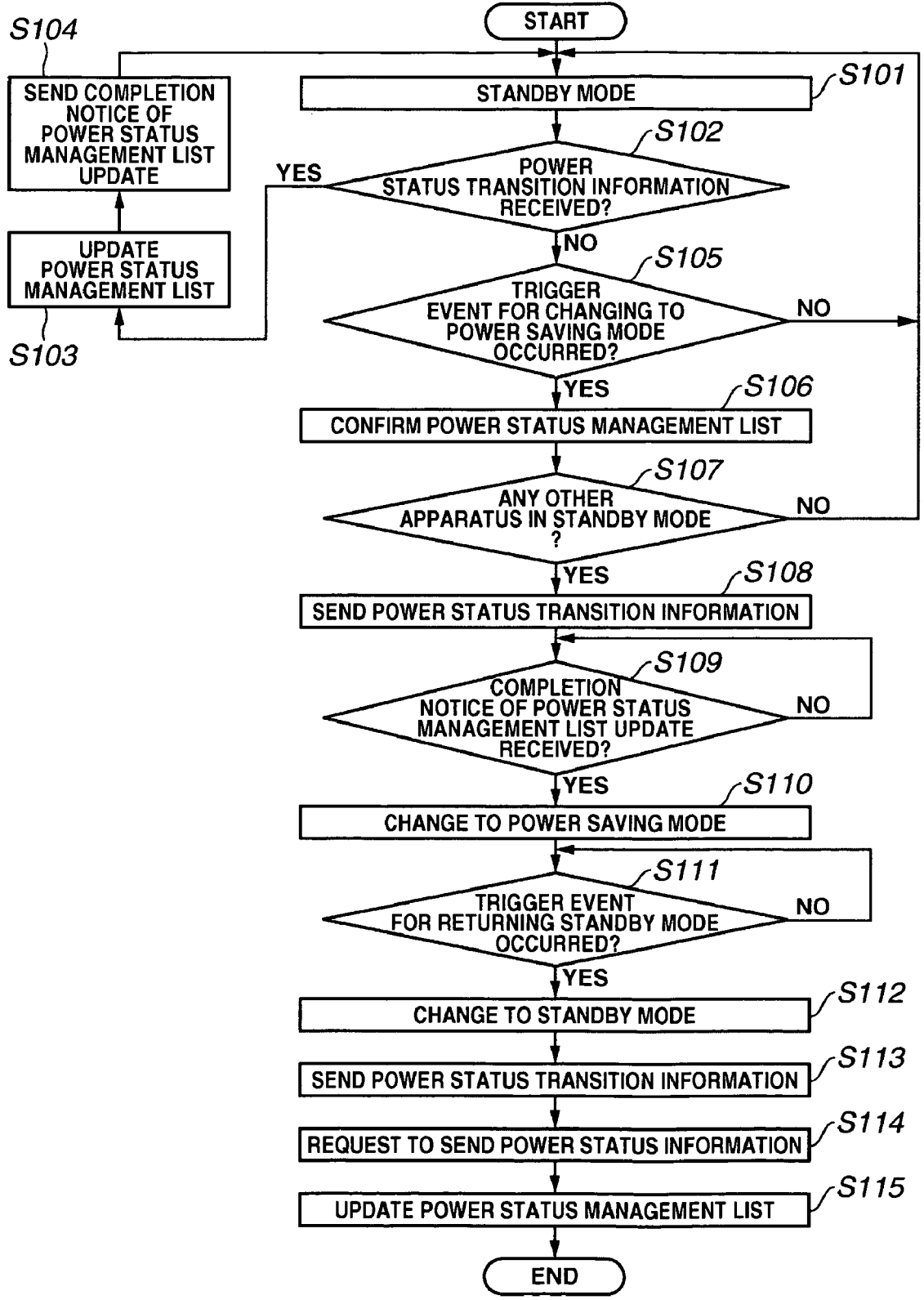
FIG. 14 is a flowchart illustrating a shifting operation of the image forming apparatus to a power saving mode corresponding to an embodiment of the present invention.

As a prerequisite for the processing in FIG. 14, at least two image forming apparatuses are connected to the wired LAN 104. For example, as shown in FIG. 15, a plurality of image forming apparatuses having IP addresses 2501 and host names 2502 allotted as MFP1 to MFP5 are connected to the wired LAN 104, thereby configuring an image forming system. At this time, the power supply status of each image forming apparatus is shown in the column 2503 in FIG. 15. Hereinafter, in the flowchart of FIG. 14, a description will be made on the case where processing is performed for an image forming apparatus of the host name MFP1. In the following description, the host name allotted to each apparatus will be used for each image forming apparatus.

Further, FIG. 15 shows a power status management list corresponding to the present embodiment. This list stores information regarding the power supply status (standby more or power saving mode) of each image forming apparatus connected to the network in association with the IP addresses 2501 and the host names 2502 as information for identifying each image forming apparatus. This list is stored in the RAM 1201 or the HDD 1204 of the control unit 939 of the image forming apparatus. Further, in addition to this, as identification information, MAC addresses and the like may be registered. The image forming apparatus in the standby mode can recognize the power supply status of other apparatuses by referring to this list.

Now referring FIG. 14, first, MFP1 is in an ordinary operating state, in which the power supply mode is the standby mode. At step S101, this standby mode is continued. Next, at step S102, polling is made as to whether power status transition information to be sent from other image forming apparatuses such as MPF2 to MPF5 is received. Here, the power status transition information is information for notifying another apparatus of the shifting power mode in association with the IP address, the host name, and the like of the apparatus. If the power status transition information is received at step S102 ("YES" at step S102), the processing proceeds to step S103, where the power status management list shown in FIG. 15 is updated.

For example, in FIG. 15, while MFP5 is in the standby mode, if MFP5 shifts to the power saving mode, the power status transition information is notified from MFP5 to MFP1. In the MFP1, the power status management list of FIG. 15 is updated according to the received power status transition information, and the power status 2503 of MFP5 is changed to the power saving mode.

Referring back to FIG. 14, next, when the updating at step S103 is completed, at step S104, a completion notice of power status management list updating is sent to the sender of the power status transition information, and the processing returns to the standby mode at step S101. At step S102, if the power status transition information is not received ("NO" at step S102), the processing proceeds to step S105, where it is determined whether a trigger event for shifting to the power saving mode has occurred. Here, the trigger event to the power saving mode includes, for example, the case where the apparatus is not used even when a timer is set and the time set in advance elapses or the case where the power consumption reduction switch of the operation panel is operated. If the trigger event to the power saving mode has occurred ("YES" at step S105), the processing proceeds to step S106, where the power status management list owned by the apparatus itself is confirmed. On the other hand, if the trigger event to the power saving mode has not occurred ("NO" at step S105), the processing returns to step S101, where the standby mode is continued.

If it is determined as a result of having confirmed the power status management list at step S106 that there exists an apparatus in the standby mode in addition to MFP1 ("YES" at step S107), the processing proceeds to step S108. On the other hand, if it is determined that there exists no apparatus in the standby mode in addition to MFP1 ("NO" at step S107), the processing returns to step S101, where the standby mode is continued. In the case of FIG. 15, since MFP5 is in the standby mode in addition to MFP1, if the trigger event to the power saving mode has occurred for MFP1, there is a possibility that MFP1 shifts to the power saving mode.

Next, at step S108, the power status transition information to the effect that MFP1 shifts to the power saving mode is sent to another apparatus (MFP5 in the case of FIG. 15) operating in the standby mode, whose existence has been confirmed at step S106 and S107. Further, at step S109, it is determined whether the completion notice of power status management list updating is received from the apparatus to which the power status transition information has been sent. If the completion notice is received ("YES" at step S109), the processing proceeds to step S110, where MFP1 shifts to the power saving mode. In the power saving mode, power is supplied to the packet incoming detecting unit of the network unit 1210, the RAM 1202, and the operating unit 140 shown in FIG. 4. On the other hand, if the completion notice is not received ("NO" at step S109), monitoring of the reception of the completion notice is continued.

After proceeding to the power saving mode at step S110, it is determined whether a trigger event for returning to the standby mode has occurred at step S111. With respect to the occurrence of the trigger event for returning to the standby mode, specifically, the network unit 1201 monitors receipt of a wake on packet through the wired LAN 104, and further, the operating unit 140 monitors whether a return instruction from the user has been received. Consequently, if the power source switch of the operating unit 140 is operated by the user or if the wake on packet is received through the wired LAN 104, the occurrence of the trigger event for returning to the standby mode is detected.

If the occurrence of the trigger event for returning to the standby mode has been detected ("YES" at step S111), the processing proceeds to step S112, where MFP1 shifts to the standby mode. Subsequently, at step S113, the power status transition information notifying to the effect that MFP1 has shifted from the power saving mode to the standby mode is sent to other apparatuses connected to the wired LAN 104. Next, at step S114, in order to prepare an up-to-date power status management list at the point of time when MFP1 has returned to the standby mode, a request for sending information is issued to other apparatuses on the wired LAN 104. In response to this request, the power status management list is sent from any apparatus operating in the standby mode. Accordingly, at step S115, based on the most recent updated list from among the power status management lists, the power status management list of MFP1 is updated.

In the determining process at step S107 as described above, if no other image forming apparatuses in the standby mode exist, MFP1 does not shift to the power saving mode. However, for example, MFP1 may shift to the power saving mode while supplying power to the wireless sending and receiving unit 1270.

<Exemplary Communication Processing Between Wireless Terminal and Image Forming Apparatus>

Next, the communication processing between the wireless terminal 101 and the image forming apparatus 102 will be described with reference to the flowchart of FIG. 16 when the image forming apparatus 103 in the power saving mode is caused to shift to the standby mode via the image forming apparatus 102 in the standby mode.

Figure 16:
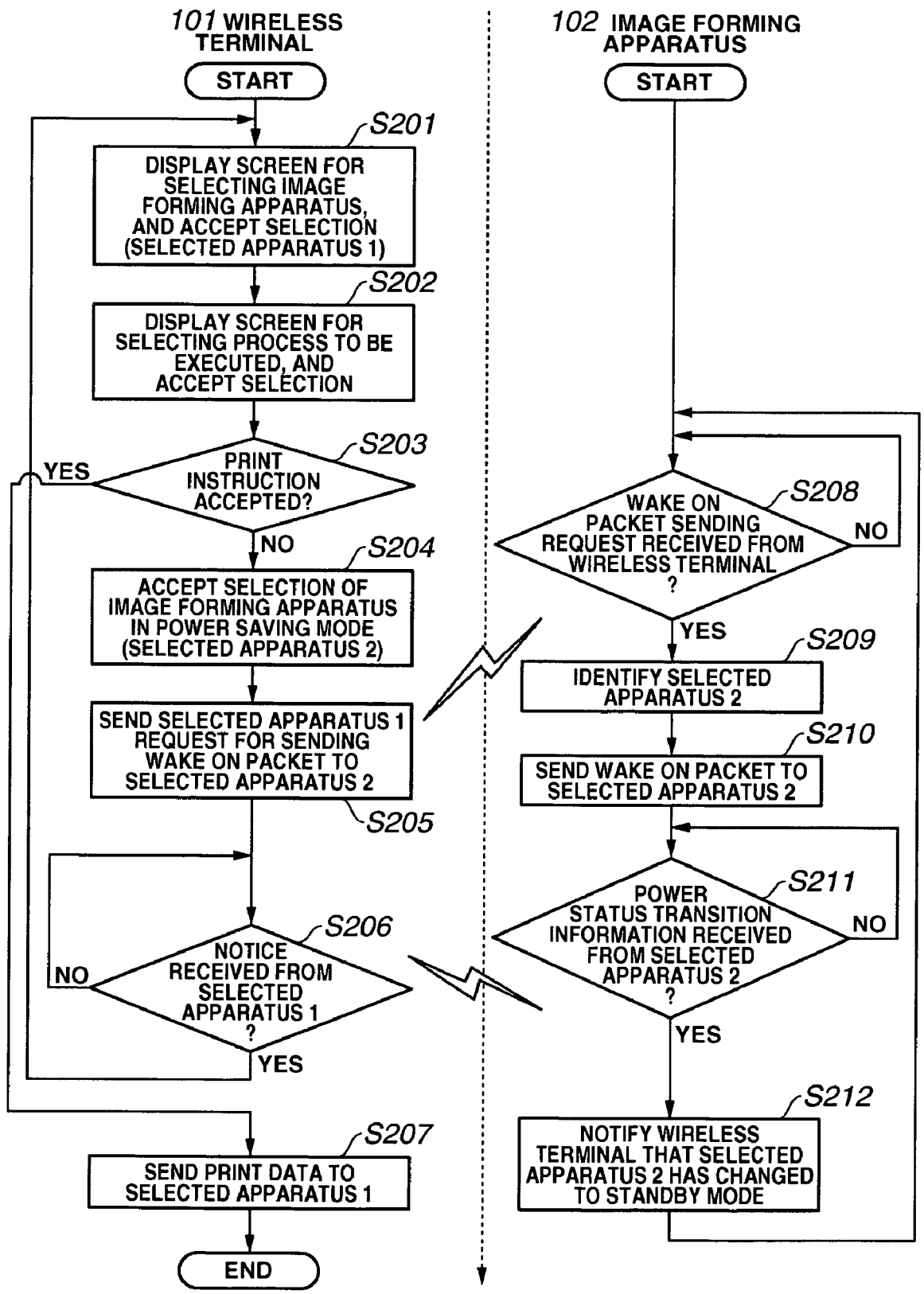
FIG. 16 is a flowchart corresponding to an example of processings in a wireless terminal and the image forming apparatus corresponding to an embodiment of the present invention.
Figure 17:
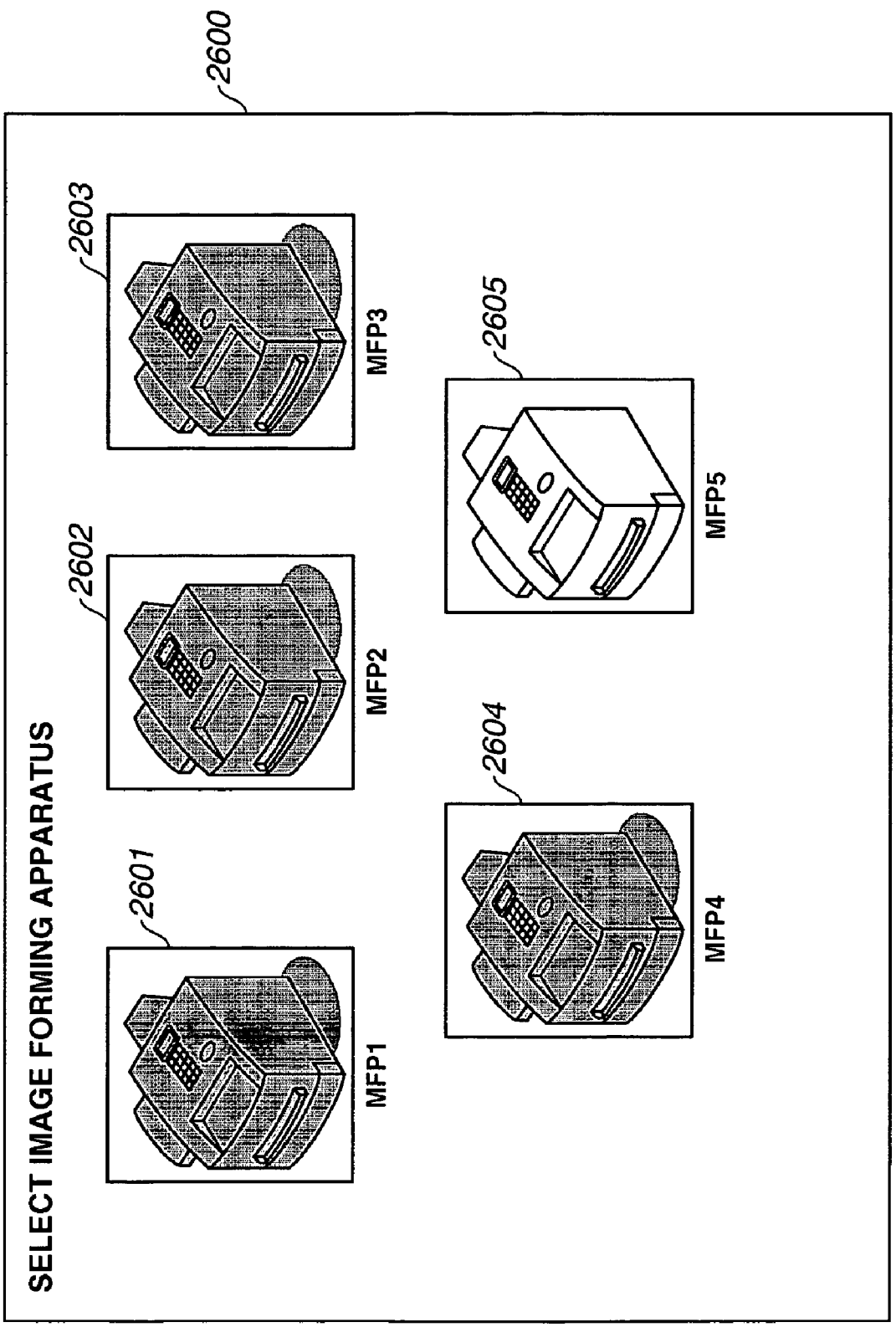
FIG. 17 is a view showing an example of a screen display in the wireless terminal corresponding to an embodiment of the present invention.

In FIG. 16, at step S201, the wireless terminal 101 displays a screen for selecting an image forming apparatus in the display of the wireless terminal 101, and accepts the selection of an image forming apparatus by the user. At this time, for example, a screen 2600 as shown in FIG. 17 is displayed in the display, and the selection of an image forming apparatus MFP1 through MFP5 (reference numerals 2601 through 2605) to be used for processing is accepted. The image forming apparatus whose selection is accepted at step S201 is referred to as a "selected apparatus 1".

In FIG. 17, a list of image forming apparatuses whose printer drivers are installed on the wireless terminal 101 is displayed. In FIG. 17, corresponding to FIG. 15, the wireless terminal 101 can use image forming apparatuses named MFP1 to MFP5 (reference numerals 2601 through 2605). Among these apparatuses, the image forming apparatuses MFP1 to the MFP4, which have been put into the power saving mode and are not capable of performing communications with the wireless terminal 101 through the wireless LAN 105 at this time, are displayed in gray out as shown in FIG. 17. On the other hand, the image forming apparatus MFP5, which is capable of performing communications with the wireless LAN 105, is displayed as recognizable to be in the standby mode. Consequently, an image forming apparatus capable of accepting the selection at step S210 is limited to MFP5. Further, in correspondence with FIG. 1, MFP5 corresponds to the image forming apparatus 102, and any one of MFP1 to MFP4 corresponds to the image forming apparatus 103.

It is conceivable that a print driver corresponding to an image forming apparatus other than MFP1 to MFP5 is also installed on the wireless terminal 101. In that case, the above-described power status management list is received from the image forming apparatus put in the standby mode, and the image forming apparatuses may be narrowed down to an image forming apparatus capable of sending a wake on packet through the wired LAN 104.

Figure 18:
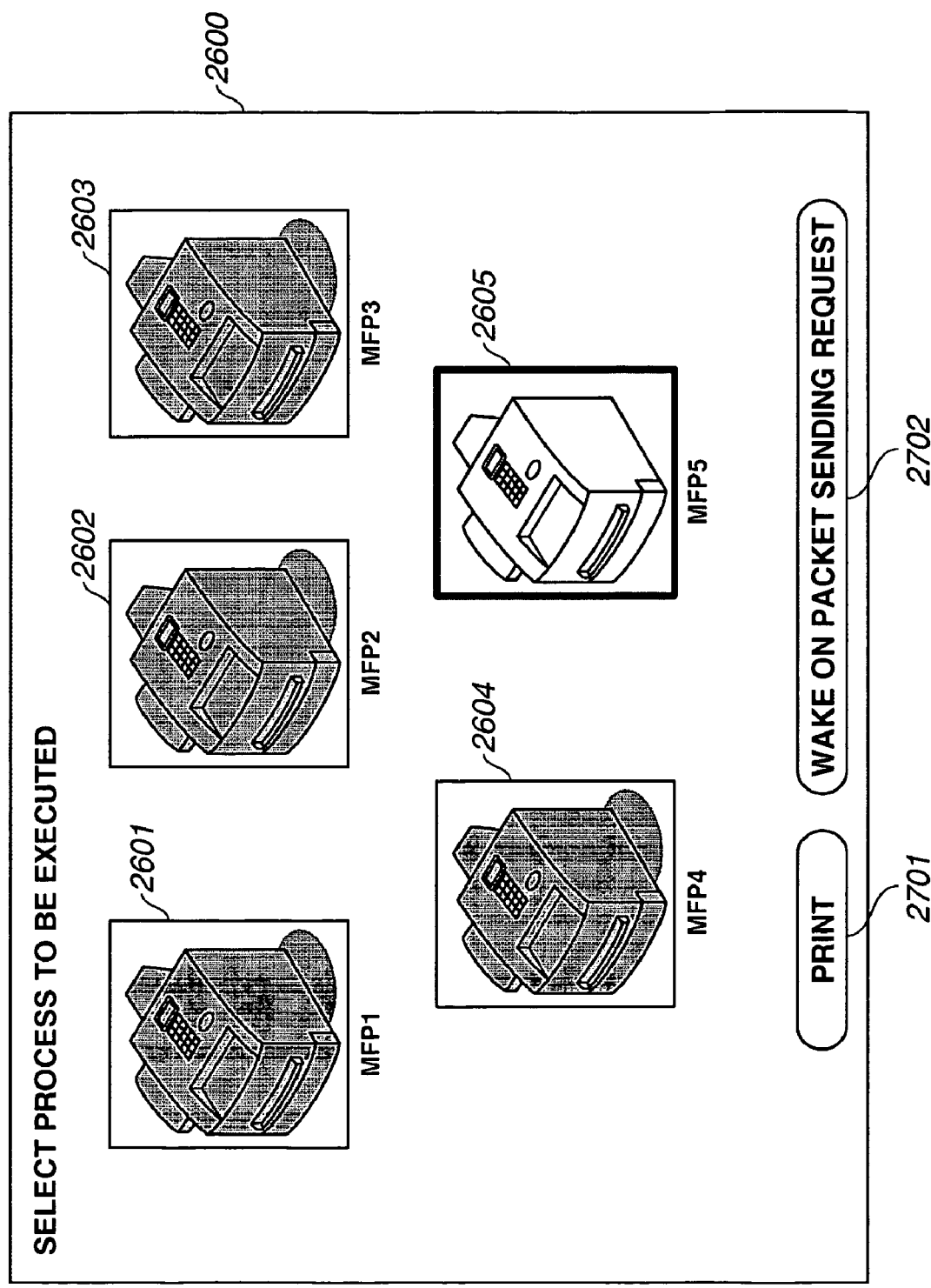
FIG. 18 is a view showing an example of a screen display in the wireless terminal corresponding to an embodiment of the present invention.

Now referring back to FIG. 16, next, at step S202, in order to accept the selection of processing ordered to be executed for the selected image forming apparatus, a screen for selecting processing to be executed is displayed as shown in FIG. 18, and the selection of processing is accepted. In FIG. 18, a state in which MFP5 has been selected is shown by the fact that the frame line 2605 of MFP5 is displayed in bold stroke. At the lower portion of the screen 2600, a print button 2701 and a wake on packet sending request button 2702 are shown as processing to accept the selection.

Next, at step S203, in the display of FIG. 18, it is determined whether a print instruction has been accepted based on the operation of the print button 2701. If the print instruction has been accepted ("YES" at step S203), the processing proceeds to step S207, where print data is sent to the image forming apparatus (selected apparatus 1) selected at step S201 through the wireless LAN 105, so that printing is performed. After that, the processing terminates.

Figure 19:
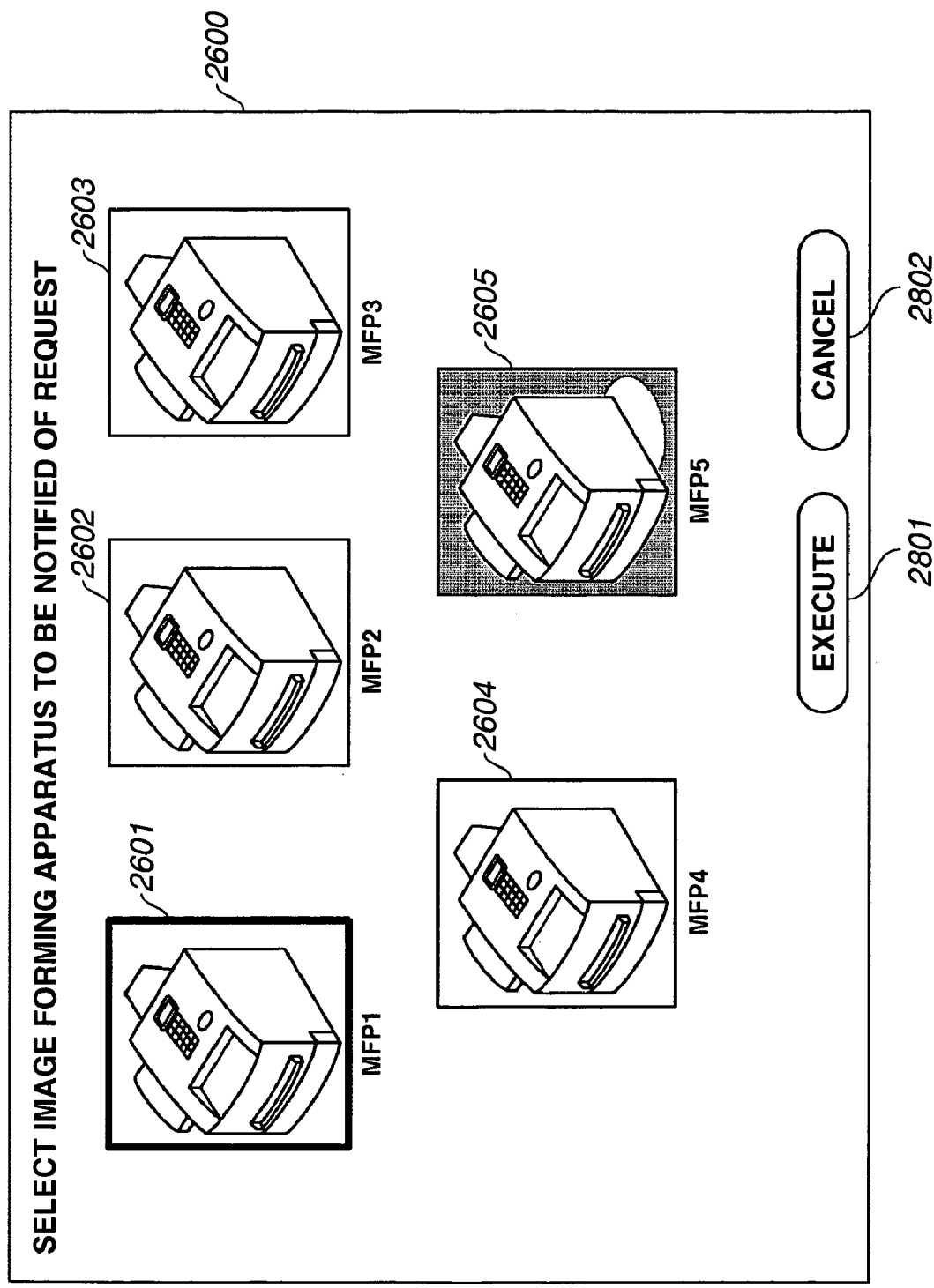
FIG. 19 is a view showing an example of a screen display in the wireless terminal corresponding to an embodiment of the present invention.

On the other hand, if the print instruction has not been accepted, that is, if the wake on packet sending request has been accepted ("NO" in state S203), the processing proceeds to step S204, where a screen such as that shown in FIG. 19 is displayed, and the selection of an image forming apparatus which becomes the destination of a wake on packet (an image forming apparatus in the power saving mode) is accepted. Here, the image forming apparatus having accepted the selection is referred to as a "selected apparatus 2".

In FIG. 19, MFP5, which is the sender of a wake on packet, is displayed in gray out, and MFP1 to MFP4, which have a possibility of being selected as the destination, are displayed as selectable. Further, FIG. 19 shows the case where MFP1 has been selected as shown in bold stroke by the frame line 2601. When any one of the image forming apparatuses is selected, an execute button 2801 and a cancel button 2802 are displayed in the lower portion of the screen 2600. The execute button 2801 is selected when a request is made for the selected apparatus 1 to send a wake on packet to the selected apparatus 2. On the other hand, the cancel button 2802 is selected when the selection of MFP1 is cancelled.

At step S205, according to the operation of the execute button 2801, a request for sending a wake on packet to MFP1 is sent to MFP5, which is the selected apparatus 1. After that, the processing proceeds to step S206, the wireless terminal 101 monitors whether a notice indicating that MFP1 has shifted to the standby mode has been received from MFP5.

On the other hand, at step S208, MFP5, which is the selected apparatus 1, monitors whether the wake on packet sending request has been received from the wireless terminal 101. If the wake on packet sending request has been received ("YES" at step S208), the processing proceeds to step S209. At step S209, first, MFP5 extracts identification information (which, for example, may be a host name or a MAC address) on an image forming apparatus of the wake on packet sending destination, which is included in the wake on packet sending request. Further, based on the extracted identification information, MFP5 identifies an image forming apparatus which becomes the sending destination of a wake on packet from the power status management list. Next, at step S210, MFP5 extracts an IP address 2501 of the image forming apparatus (MFP1 in the present embodiment) identified at step S209 from the power status management list, and using the IP address 2501, sends a wake on packet to MFP1 through the wired LAN 104.

MFP1, as described in relation to step S111 of the flowchart of FIG. 14, monitors the occurrence of the standby mode return event, and when receiving the wake on packet, shifts to the standby mode at steps S112. Then, MFP1 sends the power status transition information to other image forming apparatuses at step S113.

Referring back to FIG. 16, at step S211, MFP5 monitors reception of the power status transition information from MFP1, to which the wake on packet has been sent. If the power status transition information has not been received ("NO" at step S211), MFP5 continues monitoring reception of the power status transition information at step S211. On the other hand, if the power status transition information has been received ("YES" at step S211), the processing proceeds to step S212, where MFP5 notifies the wireless terminal 101 that MFP1, which is the selected apparatus 2, has shifted to the standby mode. After that, the processing returns to step S208, where MFP5 continues monitoring reception of the wake on packet sending request sent from the wireless terminal 101.

The wireless terminal 101, at step S206, monitors whether the notice indicating that MFP1 has shifted to the standby mode has been received from MFP5. If the notice has been received ("YES" at step S206), the processing proceeds to step S201, where the wireless terminal 101 performs the above-described processing again. In this case, the screen for selecting an image forming apparatus shown in FIG. 17 displays MFP1 as selectable. If the notice has not been received ("NO" at step S206), the wireless terminal 101 continues monitoring reception of the notice.

According to the present embodiment as described above, in an image forming system configured by a plurality of image forming apparatuses, even if the network connection cannot be established by the wireless LAN when an image forming apparatus desired by the user to output an image is put in the power saving mode, the image forming apparatus can be waken up to shift to the standby mode through the wired LAN by another image forming apparatus in the standby mode. Consequently, the power consumption reduction can be attained as a whole without reducing the user-friendliness of the image forming system.

Other Exemplary Embodiments

The present invention can be applied to a system configured by a plurality of apparatuses (for example, a host computer, an interface device, a reader, a printer, and the like), or can be applied to a device comprising one apparatus (for example, a copying machine, a facsimile device, and the like).

Further, the present invention can be implemented by providing a system or an apparatus with a storage medium (or recording medium) storing program code of software realizing the functions of the above-described embodiments, and also by reading and executing the program code stored in the storage medium by a computer (or CPU or MPU) of the system or the apparatus. In this case, the program code itself read from the storage medium realizes the functions of the above-described embodiments, and the storage medium storing the program code configures the present invention. Further, in addition to a case where the functions of the above-described embodiments are realized by executing the program code read by the computer, the present invention includes a case where an operation system (OS) and the like running on the computer performs a part or the whole of the actual processing based on instructions of the program code, and the functions of the above-described embodiments are realized by that processing.

Furthermore, the present invention includes a case where the program code read from the storage medium is written into a memory provided in a function expansion card inserted into the computer or a function expansion unit connected to the computer, and after that, a CPU provided in the function expansion card or the function expansion unit performs a part or the whole of the actual processing based on instructions of the program code, and the functions of the above-described embodiments are realized by that processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-167370 filed Jun. 7, 2005, which is hereby incorporated by reference herein in its entirety.

What is claimed:

1. A data processing system including a first data processing apparatus that receives wireless communication data sent from a wireless terminal, and second data processing apparatus that receives wireless communication data sent from the wireless terminal and that communicates with the first data processing apparatus via a wired network, the data processing system comprising:

the first data processing apparatus including,
a first wireless communication unit configured to receive from the wireless terminal a shift request for shifting the second data processing apparatus from a first status incapable of receiving the wireless communication data to a second status capable of receiving the wireless communication data; and
a first wired communication unit configured to, responsive to the first wireless communication unit receiving the shift request, send a shift signal for shifting the second data processing apparatus from the first status to the second status to the second data processing apparatus via the wired network; and the second data processing apparatus including,
a second wireless communication unit configured to receive wireless communication data from the wireless terminal;
a second wired communication unit configured to receive the shift signal sent by the first wired communication unit from the first data processing apparatus via the wired network; and
a status shift unit configured to, responsive to the second wired communication unit receiving the shift signal, shift the second data processing apparatus from the first status to the second status,
wherein the first data processing apparatus further comprises,
a determining unit configured to determine whether a third data processing apparatus operating in the second status exist on the wired network in a case where the first data processing apparatus shifts from the second status to the first status; and
a control unit configured to enable the first data processing apparatus to shift from the second status to the first status in a case where the determining unit determines that the third data processing apparatus exists, and to disable the first data processing apparatus to shift from the second status to the first status in a case where the determining unit determines that the third data processing apparatus does not exist,
wherein, when the second data processing apparatus has shifted from the first status to the second status, the second wired communication unit sends a notification signal indicating that the second data processing apparatus has shifted from the first status to the second status to the first wired communication unit via the wired network, and
wherein responsive to the first wired communication unit receiving the notification signal, the first wireless communication unit notifies the wireless terminal that the second data processing apparatus has shifted from the first status to the second status.

2. The data processing system according to claim 1, wherein the first status is a status in which power is supplied to the second wired communication unit and power is not supplied to the second wireless communication unit.

3. The data processing system according to claim 1, wherein the first data processing apparatus further comprises a printing unit configured to execute printing based on wireless communication data received from the wireless terminal by the first wireless communication unit.

4. The data processing system according to claim 1, wherein the second data processing apparatus further comprises a printing unit configured to execute printing based on wireless communication data received from the wireless terminal by the second wireless communication unit.

5. A data processing apparatus that communicates with other data processing apparatus via a wired network, the data processing apparatus comprising:
a first wireless communication unit configured to receive from a wireless terminal a shift request for shifting the second data processing apparatus from a first status incapable of receiving wireless communication data to a second status capable of receiving the wireless communication data; and a first wired communication unit configured to, responsive to the first wireless communication unit receiving the shift request, send the shift signal for shifting the other data processing apparatus from the first status to the second status to the other data processing apparatus via the wired network, a determining unit configured to determine whether a third data processing apparatus operating in the second status exist on the wired network in a case where the data processing apparatus shifts from the second status to the first status; and a control unit configured to enable the data processing apparatus to shift from the second status to the first status in a case where the determining unit determines that the third data processing apparatus exists, and to disable the data processing apparatus to shift from the second status to the first status in a case where the determining unit determines that the third data processing apparatus does not exist, wherein, when the other data processing apparatus has shifted from the first status to the second status, the first wired communication unit receives via the wired network a notification signal indicating that the other data processing apparatus has shifted from the first status to the second status, and wherein responsive to the first wired communication unit receiving the notification signal, the first wireless communication unit notifies the wireless terminal that the other data processing apparatus has shifted from the first status to the second status.

6. The data processing apparatus according to claim 5, wherein the other data processing apparatus includes, a second wireless communication unit configured to receive wireless communication data from the wireless terminal; and a second wired communication unit configured to receive the shift signal from the first wired communication unit, and wherein the first status is a status in which power is supplied to the second wired communication unit and power is not supplied to the second wireless communication unit.

7. The data processing apparatus according to claim 6, wherein the other data processing apparatus further comprises a printing unit configured to execute printing based on wireless communication data received from the wireless terminal by the second wireless communication unit.

8. The data processing apparatus according to claim 5, further comprising a printing unit configured to execute printing based on wireless communication data received from the wireless terminal by the first wireless communication unit.

* * * * *